United States Patent
Kim et al.

(10) Patent No.: US 11,050,061 B2
(45) Date of Patent: Jun. 29, 2021

(54) CONDUCTIVE MATERIAL DISPERSED LIQUID AND LITHIUM SECONDARY BATTERY MANUFACTURED USING THE SAME

(71) Applicant: LG Chem, Ltd., Seoul (KR)

(72) Inventors: Ye Lin Kim, Daejeon (KR); Jong Heon Seol, Daejeon (KR); Kyung Yeon Kang, Daejeon (KR); Sang Hoon Choy, Daejeon (KR); Ji Hee Woo, Daejeon (KR); Dong Hyun Cho, Daejeon (KR)

(73) Assignee: LG Chem, Ltd.

( * ) Notice: Subject to any disclaimer, the term of this patent is extended or adjusted under 35 U.S.C. 154(b) by 157 days.

(21) Appl. No.: 15/741,676

(22) PCT Filed: Oct. 28, 2016

(86) PCT No.: PCT/KR2016/012301
§ 371 (c)(1),
(2) Date: Jan. 3, 2018

(87) PCT Pub. No.: WO2017/074124
PCT Pub. Date: May 4, 2017

(65) Prior Publication Data
US 2018/0198129 A1    Jul. 12, 2018

(30) Foreign Application Priority Data

Oct. 28, 2015  (KR) .................. 10-2015-0149938
Oct. 28, 2016  (KR) .................. 10-2016-0142055

(51) Int. Cl.
*H01M 4/62*    (2006.01)
*H01M 10/052*    (2010.01)
(Continued)

(52) U.S. Cl.
CPC .......... *H01M 4/625* (2013.01); *H01M 4/0404* (2013.01); *H01M 4/139* (2013.01); *H01M 4/622* (2013.01); *H01M 10/052* (2013.01)

(58) Field of Classification Search
CPC .... H01M 4/625; H01M 4/622; H01M 4/0404; H01M 4/139; H01M 10/052;
(Continued)

(56) References Cited

U.S. PATENT DOCUMENTS

2010/0059720 A1    3/2010    Berkei et al.
2015/0273441 A1    10/2015    Kim et al.
(Continued)

FOREIGN PATENT DOCUMENTS

CN    104918881 A    9/2015
EP    3093910 A1    11/2016
(Continued)

OTHER PUBLICATIONS

Machine translation of KR 1020150016852, Kim et al., 2015 (Year: 2015).*

(Continued)

*Primary Examiner* — Kwang Han
(74) *Attorney, Agent, or Firm* — Lerner, David, Littenberg, Krumholz & Mentlik, LLP

(57) ABSTRACT

The present invention provides: a conductive material dispersed liquid containing a conductive material, a dispersant, and a dispersion medium, wherein the conductive material comprises bundle-type carbon nanotubes having a bulk density in a range of 10-50 kg/m$^3$ and a conductivity satisfying the conditions of Equation 1 below, thereby exhibiting excellent dispersibility and conductivity; and a lithium secondary battery, which is manufactured using the conductive material dispersed liquid and thus can exhibit excellent battery functions, especially, excellent output characteristics at low temperatures:

(Continued)

$-X \leq 10 \log R \leq -0.6X$      [Equation 1]

(in Equation 1 above, X is a bulk density of the carbon nanotubes, and R is a powder resistance of the carbon nanotubes under a pressure of 10 to 65 MPa.).

15 Claims, 20 Drawing Sheets

(51) Int. Cl.
    *H01M 4/139*      (2010.01)
    *H01M 4/04*      (2006.01)

(58) Field of Classification Search
    CPC ......... H01M 2220/10; H01M 2220/20; H01M 4/13; H01M 2/1016; H01M 50/20; Y02E 60/122; Y02E 60/10
    See application file for complete search history.

(56) References Cited

U.S. PATENT DOCUMENTS

| | | | |
|---|---|---|---|
| 2015/0298974 A1 | 10/2015 | Kim et al. | |
| 2017/0137607 A1* | 5/2017 | Brandau | ................ C08L 21/00 |

FOREIGN PATENT DOCUMENTS

| | | | | |
|---|---|---|---|---|
| JP | 2005075661 | A | | 3/2005 |
| JP | 2011029408 | A | | 2/2011 |
| JP | 2014208328 | A | | 11/2014 |
| JP | 2015123410 | A | | 7/2015 |
| JP | 2016035883 | A | | 3/2016 |
| KR | 20130117744 | A | | 10/2013 |
| KR | 20150016852 | A | | 2/2015 |
| KR | 1020150016852 | | * 2/2015 | ............. C01B 31/02 |
| KR | 20150037601 | A | | 4/2015 |
| KR | 1020150037601 | | * 4/2015 | ............. C01B 31/02 |
| WO | 2006064970 | A1 | | 6/2006 |
| WO | 2015020280 | A1 | | 2/2015 |
| WO | 2015105167 | A1 | | 7/2015 |

OTHER PUBLICATIONS

Machine translation of KR 1020150037601, Kim et al., 2015 (Year: 2015).*

Search report from International Application No. PCT/KR2016/012301, dated Feb. 7, 2017.

Goto et al., "Characterization of Multi-Walled Carbon Nanotubes Which Were Processed by a Dispersion Method and Applications to Electro Conductive Thin Layers", Kobunshi Ronbunshu, vol. 67, Issue 2, Jan. 2010, pp. 89-96.

Third Party Observation for Application No. JP 2018525334 dated Sep. 5, 2019, 3 pages.

Extended European Search Report including Written Opinion for Application No. EP16860307.4 dated Apr. 26, 2018.

Chinese Search Report for Application No. 201680042062.6 dated Apr. 2, 2020, 1 page.

* cited by examiner

CONDUCTIVE MATERIAL DISPERSED LIQUID AND LITHIUM SECONDARY BATTERY MANUFACTURED USING THE SAME

CROSS-REFERNECE TO RELATED APPLICATIONS

This application is a national phase entry under 35 U.S.C. § 371 of International Application No. PCT/KR2016/012301, filed on Oct. 28, 2016 which claims priority to Korean Patent Application No. 10-2015-0149938, filed Oct. 28, 2015, and Korean Patent Application No. 10-2016-0142055, filed Oct. 28, 2016, the disclosures of which are incorporated herein by reference.

TECHNICAL FIELD

The present invention relates to a conductive material dispersed liquid having excellent conductivity and dispersibility, and a lithium secondary battery manufactured using the same.

BACKGROUND ART

As technology development and demand for mobile devices increase, demand for secondary batteries as energy sources is rapidly increasing. Among these secondary batteries, lithium secondary batteries having a high energy density and voltage, a long cycle life and a low self-discharge rate are commercially available and widely used. Further, as an electrode for such a high-capacity lithium secondary battery, research on a method for producing an electrode having a higher energy density per unit volume by improving an electrode density has been actively conducted.

Generally, since a high-density electrode is formed by molding electrode active material particles having a size of several μm to several tens of μm using a high-pressure press, particles are deformed, the space between the particles is reduced, and electrolyte permeability is liable to be lowered.

In order to solve such a problem, a conductive material having excellent electrical conductivity and strength is used in the production of electrodes. When a conductive material is used in the production of electrodes, the conductive material is dispersed among the compressed electrode active material, and thereby fine pores are maintained between the active material particles to facilitate the penetration of the electrolyte, and the resistance in the electrode can be lowered due to excellent conductivity. Among such conductive materials, the use of carbon nanotubes, which are fibrous carbon-based conductive materials, capable of further reducing electrode resistance by forming an electrically conductive path in the electrode has been increasing.

The carbon nanotube, which is a type of fine carbon fiber, is tubular carbon having a diameter of 1 μm or less, and is expected to be applied and practically used in various fields due to high conductivity, tensile strength and heat resistance attributable to the specific structure thereof. However, despite the availability of such carbon nanotubes, the use of carbon nanotubes is limited due to low solubility and dispersibility thereof. Accordingly, in the preparation of electrodes using carbon nanotubes, carbon nanotubes are linearly dispersed in a dispersion medium, and then a composition for forming an electrode is prepared and used. However, carbon nanotubes are not stably dispersed in the dispersion medium, and an aggregation phenomenon occurs due to the strong van der Waals attraction between the carbon nanotubes.

Various attempts have been made to address these issues. Specifically, a method of dispersing carbon nanotubes in a dispersion medium through mechanical dispersion treatment such as ultrasonic treatment has been proposed. However, in this method, dispersibility is excellent while the ultrasonic wave is irradiated, but when the ultrasonic irradiation is finished, the carbon nanotubes start to aggregate. Further, a method of dispersing and stabilizing carbon nanotubes using various dispersants has been proposed. However, this method also has a problem in that, when carbon nanotubes are dispersed at a high concentration in a dispersion medium, handling becomes difficult due to an increase in viscosity.

Accordingly, there is a need for development of a method capable of improving the dispersibility of carbon nanotubes in an electrode without reducing conductivity, and a method of preparing a carbon nanotube dispersed liquid which is useful in the production of electrodes using the above-described method.

DISCLOSURE

Technical Problem

A first objective of the present invention is to provide a conductive material dispersed liquid having excellent conductivity and dispersibility.

A second objective of the present invention is to provide a composition for forming an electrode of a lithium secondary battery, which includes the conductive material dispersed liquid.

Further, a third objective of the present invention is to provide a lithium secondary battery manufactured using the conductive material dispersed liquid.

Technical Solution

In order to achieve the objectives, according to an embodiment of the present invention, there is provided a conductive material dispersed liquid, including a conductive material, a dispersant, and a dispersion medium, wherein the conductive material includes bundle-type carbon nanotubes having a bulk density in a range of 10 to 50 kg/m³ and a conductivity satisfying the condition of the following Equation 1.

$$-X \leq 10 \log R \leq -0.6X \qquad \text{[Equation 1]}$$

(in Equation 1, X is a bulk density of the carbon nanotubes, and R is a powder resistance of the carbon nanotubes under a pressure of 10 to 65 MPa.)

According to another embodiment of the present invention, there is provided a composition for forming an electrode of a lithium secondary battery, which includes the conductive material dispersed liquid.

According to still another embodiment of the present invention, there is provided a lithium secondary battery which includes an electrode prepared using the composition for forming an electrode.

Other details of embodiments of the present invention are incorporated in the detailed description of the invention described below.

Advantageous Effects

A conductive material dispersed liquid according to the present invention can exhibit excellent conductivity and dispersibility due to uniform dispersion of carbon nanotubes having excellent conductivity in a dispersion liquid. Accordingly, when electrodes of lithium secondary batteries are formed, excellent dispersibility of the conductive material in the electrode can be shown, and the conductivity in the electrode is increased to improve battery performance, and particularly, output characteristics at lower temperatures when the conductive material dispersed liquid is applied to a battery. The conductive material dispersed liquid is useful for the production of batteries requiring high output characteristics such as automobile batteries.

DESCRIPTION OF DRAWINGS

The accompanying drawings illustrate a preferred embodiment of the present disclosure and together with the foregoing disclosure, serve to provide further understanding of the technical spirit of the present disclosure, and thus, the present disclosure should not be construed as being limited to the drawings.

BEST MODE FOR CARRYING OUT THE INVENTION

Figure 1:
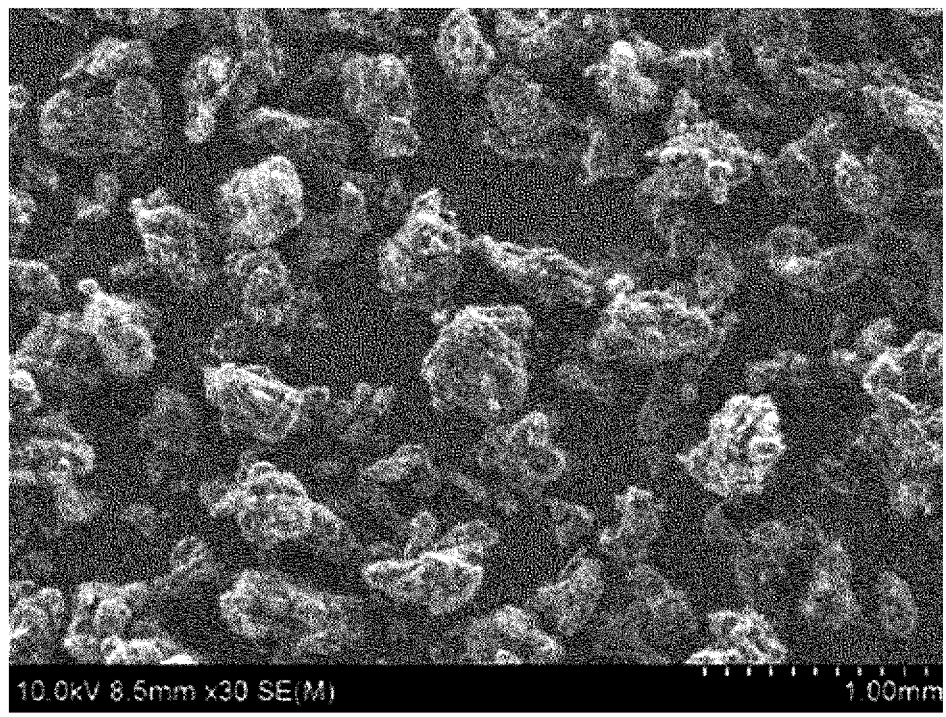
FIGS. 1 to 3 show pictures of carbon nanotubes of Example 1-1 observed at different observation magnifications using a scanning electron microscope.

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Unless otherwise specified, the term "bundle type" used in the present invention refers to a secondary shape of bundles or ropes in which a plurality of carbon nanotube strands, that is, carbon nanotube units are arranged such that the axes in the longitudinal direction of the units are arranged in a substantially parallel orientation, or are spirally twisted. Further, the term "non-bundle type" or "entangled type" refers to a shape in which a plurality of carbon nanotube units are entangled without a constant shape and not limited to specific orientations.

Generally, physical properties of carbon nanotubes (CNTs) may vary depending on the crystallinity, structure and morphology of units forming carbon nanotubes, the structure and morphology of secondary particles formed of the units, components contained in the carbon nanotubes including impurities, etc. Accordingly, the physical properties required depending on the use of the carbon nanotubes can be obtained by controlling one or a combination of two or more of these factors.

Accordingly, in the present invention, both the bulk density and powder resistance of carbon nanotubes used in the preparation of conductive material dispersed liquid are controlled such that the conductive material dispersed liquid exhibits excellent dispersibility and conductivity, and as a result, the conductivity in the electrode is improved when the conductive material dispersed liquid is applied to the production of electrodes, and thereby battery performance, and particularly, output characteristics of batteries at low temperatures can be greatly improved.

Specifically, a conductive material dispersed liquid according to an embodiment of the present invention includes a conductive material, a dispersant, and a dispersion medium, wherein the conductive material includes bundle-type carbon nanotubes having a bulk density in a range of 10 to 50 kg/m$^3$ and a conductivity satisfying the condition of the following Equation 1.

$$-X \leq 10 \log R \leq -0.6X \qquad \text{[Equation 1]}$$

(in Equation 1, X is a bulk density of the carbon nanotubes, and R is a powder resistance of the carbon nanotubes under a pressure of 10 to 65 MPa.)

Further, in the present invention, a bulk density of the carbon nanotubes may be defined by the following Equation 2.

$$\text{Bulk density (kg/m}^3\text{)=Weight of carbon nanotubes (kg)/Volume of carbon nanotubes (m}^3\text{)} \qquad \text{[Equation 2]}$$

More specifically, the carbon nanotubes may have a bulk density in the range of 20 to 35 kg/m$^3$, and a powder resistance of 0.013 Ω·cm or less, more specifically in the range of 0.001 to 0.01 Ω·cm under a pressure of 10 to 65 MPa, considering the remarkable effect of improving the conductivity and dispersibility of carbon nanotubes by controlling both the bulk density and powder resistance.

In the conductive material dispersed liquid according to an embodiment of the present invention, a carbon nanotube is a secondary structure formed by aggregating carbon nanotube units such that carbon nanotube units are fully or partially bundled. The carbon nanotube unit has graphite sheets in a cylinder form with nano-sized diameters and having $sp^2$ bond structures. According to the rolling angles and structures of the graphite sheets, the carbon nanotube units show conductive or semiconductive characteristics. The carbon nanotube units may be classified into single-walled carbon nanotubes (SWCNT), double-walled carbon nanotubes (DWCNT), and multi-walled carbon nanotubes (MWCNT) according to the number of bonds forming walls. The carbon nanotube units have lower resistance as the wall thereof is thinner. Accordingly, the carbon nanotubes may include one or two or more of single-walled, double-walled and multi-walled carbon nanotube units in the conductive material dispersed liquid according to an embodiment of the present invention.

Further, when the diameter of the carbon nanotube unit as a conductive material for lithium secondary batteries is excessively large, a pore diameter of an electrode is greatly increased, and thus electrode density may be rather lowered. Furthermore, when the diameter of the carbon nanotube unit is too small, dispersed carbon nanotube units or carbon nanotubes are buried in the space between the electrode active material particles, and thus it is difficult to form sufficient pores in an electrode layer. Accordingly, an average diameter of the carbon nanotube unit of carbon nanotubes usable in the present invention may be in the range of 5 to 30 nm, and the average diameter of the carbon nanotube unit may be in the range of 10 to 20 nm considering the effect of improving the dispersibility of the conductive material and reducing the resistance in the electrode according to control of the diameter of the carbon nanotube unit. The carbon nanotube unit refers to one strand of carbon nanotube.

Further, the longer the length of the carbon nanotube unit is, the better the electrical conductivity, strength and electrolyte retention function of the electrode are. However, when the length of the carbon nanotube unit is too long, dispersibility may be lowered. Accordingly, a length of the carbon nanotube unit of carbon nanotubes usable in the present invention may be in the range of 0.5 to 200 μm. Further, in consideration of the diameter of the carbon nanotube unit, the carbon nanotube unit may have an aspect ratio of 5 to 50,000, more specifically 10 to 20,000, which is defined as a ratio of the length to the diameter of the carbon nanotube unit.

In the present invention, the length of the carbon nanotube unit refers to the length of a long axis passing through the center of the carbon nanotube unit, and the diameter of the carbon nanotube unit refers to the length of a short axis perpendicular to the long axis passing through the center of the carbon nanotube unit.

Moreover, carbon nanotubes including the carbon nanotube unit may have a ratio (TD/BD ratio) of a true density (TD) to a bulk density (BD) in the range of 70 to 120.

In the present invention, the true density of the carbon nanotubes is measured using a Pycnometer (AccuPycII 1340), and differs from the bulk density in that the true density is a density relative to the volume of particles themselves except for pores in a porous solid. Accordingly, the internal structure of the carbon nanotube may be predicted from the TD/BD ratio. When the TD/BD ratio is excessively high, the content of the carbon nanotube unit in the carbon nanotube is low, and thus capacity characteristics of the battery may be reduced. When the TD/BD ratio is too small, the dispersibility of the carbon nanotubes may be lowered. The TD/BD ratio of the carbon nanotubes usable in the present invention may be, more specifically, in the range of 70 to 100 considering significant improvement effects according to control of the ratio of the bulk density and true density. Further, the true density of the carbon nanotubes usable in the present invention may be in the range of 1,800 to 2,200 $kg/m^3$ under the conditions satisfying the above TD/BD ratio.

Further, in the conductive material dispersed liquid according to an embodiment of the present invention, the carbon nanotube has a small unit average diameter as described above, and has a high BET specific surface area due to the high TD/BD ratio, and can exhibit excellent dispersibility. Specifically, a BET specific surface area of the carbon nanotubes usable in the present invention may be in the range of 180 to 300 $m^2/g$, and more specifically in the range of 230 to 280 $m^2/g$.

In the present invention, the specific surface area of the carbon nanotubes is measured by a BET method. Specifically, the specific surface area of the carbon nanotubes may be calculated from an amount of nitrogen gas adsorbed at a liquid nitrogen temperature (77K) using BELSORP-mini II manufactured by BEL JAPAN, INC.

Further, in the conductive material dispersed liquid according to an embodiment of the present invention, the carbon nanotubes may have an average value in the range of 0.75 to 1.05, and specifically, 0.95 to 1.04, and a standard deviation value in the range of 1.3 to 2.0%, and specifically, 1.5 to 2.0%, of a ratio (ID/IG) of a maximum peak intensity (ID) of a D band at $1,360\pm50$ $cm^{-1}$ to a maximum peak intensity (IG) of a G band at $1,580\pm50$ $cm^{-1}$ obtained by Raman spectroscopy using a laser having a wavelength of 532 nm.

Raman spectroscopy is a method for analyzing the structure of carbon nanotubes, and also is a useful method for analysis of the surface state of carbon nanotubes. The peak in the region around a wavenumber of 1580 $cm^{-1}$ in the Raman spectra of carbon nanotubes is called a G band, which is a peak showing an $sp^2$ bond of carbon nanotubes and represents a carbon crystal with no structural defects. Further, the peak in the region around a wavenumber of 1360 $cm^{-1}$ in the Raman spectra of carbon nanotubes is called a D band, which is a peak showing an $sp^3$ bond of carbon nanotubes and increases when the atomic bond formed by the $sp^2$ bond is broken and becomes the $sp^3$ bond. Since the D band increases when disorder or defects present in the carbon nanotubes are generated, the degree of generated disorder or defects may be quantitatively evaluated by calculating the ratio (ID/IG) of the maximum peak intensity (ID) of the D band to the maximum peak intensity (IG) of the G band.

In the present invention, the G band of Raman spectra for carbon nanotubes may be a peak in the region of the wavenumber of $1,580\pm50$ $cm^{-1}$, and the D band may be a peak in the region of the wavenumber of $1,360\pm50$ $cm^{-1}$. The wavenumber range for the G band and D band corresponds to a range that may be shifted according to a laser light source used in Raman spectroscopy. The Raman values used in the present invention are not particularly limited, and may be measured at a laser wavelength of 532 nm using a DXR Raman microscope (Thermo Electron Scientific Instruments LLC).

Generally, the larger the ratio of a G band peak integral and a D band peak integral is, the larger the amount of amorphous carbon is, or the poorer the crystallinity of the carbon nanotube is, but in the present invention, since the BET specific surface area of carbon nanotubes is increased and carbon nanotubes have a secondary shape with a bundle structure, carbon nanotubes have excellent crystallinity and have the average value and standard deviation value of ID/IG as described above.

In the conductive material dispersed liquid according to an embodiment of the present invention, the carbon nanotubes may include metal elements in an amount of 50 ppm or less, more specifically 5 ppm or less, which are derived from a main catalyst or a cocatalyst such as Co, Mo, V, or Cr used in the production process, and more specifically, may include no Fe. As such, when the metal content as a residual impurity in the carbon nanotubes is remarkably reduced, and particularly, Fe is not included in the carbon nanotubes, electrodes to which the carbon nanotubes are applied can exhibit better conductivity without worrying about side reactions.

In the present invention, the content of residual metal impurities in the carbon nanotubes may be analyzed using inductively coupled plasma (ICP).

The carbon nanotubes may be prepared by a conventional method such as an arc discharge method, a laser evaporation method, or a chemical vapor deposition method. The above-described physical properties may be realized by controlling the calcination temperature in the preparation process, the type and content of the catalyst, or the impurity removal process.

Specifically, when carbon nanotubes are prepared by a chemical vapor phase synthesis method, the carbon nanotubes may be prepared by a method which includes a step of contacting a supported catalyst in which a metal catalyst is supported on a support with a carbon source under heating to prepare carbon nanotubes, and a step of selectively removing metal impurities in carbon nanotubes as necessary.

More specifically, preparation of carbon nanotubes according to the chemical vapor phase synthesis method may be performed by introducing the supported catalyst into a fixed-bed reactor or a fluidized-bed reactor, and then injecting a carbon source, or a mixed gas of the carbon source, a reducing gas (e.g., hydrogen or the like) and a carrier gas (e.g., nitrogen) thereinto at a temperature not lower than the pyrolysis temperature of the carbon source or not higher than the melting point of the supported metal catalyst, and decomposing the carbon source to grow carbon nanotubes by the chemical vapor phase synthesis method. The carbon nanotubes prepared by the chemical vapor phase synthesis method have a crystal growth direction almost parallel to the longitudinal direction of the carbon nanotube unit and high crystallinity of the graphite structure in the longitudinal direction of the carbon nanotube unit. As a result, the unit has a small diameter, and high electric conductivity and strength.

Further, a heating process in the preparation of the carbon nanotubes may be performed at a temperature in the range of 550 to less than 800° C., and more specifically, 550 to 700° C. Within this temperature range, the generation of amorphous carbon is minimized, and the weight is lowered while maintaining the bulk size, that is, the volume, of the carbon nanotubes prepared, and thus the dispersibility according to the reduction of the bulk density can be further improved. As a heat source for the heating process, induction heating, radiant heat, laser, IR, microwave, plasma, surface plasmon heating or the like may be used.

Further, carbon may be supplied as a carbon source in the preparation of the carbon nanotubes, and any carbon source may be used without particular limitation as long as it can be present in a gas phase at a temperature of 300° C. or more. Specifically, the carbon source may be a carbon-based compound having 6 or less carbon atoms, and more specifically, examples thereof include carbon monoxide, methane, ethane, ethylene, ethanol, acetylene, propane, propylene, butane, butadiene, pentane, pentene, cyclopentadiene, hexane, cyclohexane, benzene, toluene or the like, and one or a mixture of two or more thereof may be used.

Further, when preparing the carbon nanotubes, a cooling process for arranging the carbon nanotube units more regularly may be further performed after carbon nanotube units are grown by the chemical vapor synthesis method as described above. Specifically, the cooling process may be performed by natural cooling according to removal of a heat source, or using a cooling device.

Further, a process of removing metal impurities for the carbon nanotubes thus prepared may be performed according to a conventional method such as washing, acid treatment, etc.

Further, the supported catalyst used in the preparation of the carbon nanotubes is a catalyst in which a metal catalyst is supported on a support of an inorganic oxide, and specifically, the inorganic oxide may be alumina, and more specifically spherical α-alumina. The α-alumina has very low porosity as compared with γ-alumina and has a low utility value as a catalyst support. However, when a calcination temperature at which the supported catalyst is formed is controlled, it is possible to increase the diameter of carbon nanotubes by reducing the specific surface area of carbon nanotubes while suppressing the generation of amorphous carbon in the synthesis of carbon nanotubes using the α-alumina. Moreover, the bulk density of carbon nanotubes may be reduced to improve dispersibility.

Specifically the α-alumina usable as a support in the present invention may have an average particle diameter ($D_{50}$) in the range of 20 to 200 μm, and may have a BET specific surface area in the range of 1 to 50 m$^2$/g. Further, the α-alumina may have a smooth surface with very low porosity, and specifically, a porosity in the range of 0.001 to 0.1 cm$^3$/g.

The supported catalyst may be prepared by supporting a metal catalyst on a support followed by calcination. Specifically, a support, specifically alumina, is added to a metal catalyst precursor solution prepared by dissolving the precursor of the metal catalyst in water, and mixed, and then calcination is performed at a temperature of 600° C. or less, and specifically, at a temperature in the range of 300 to 500° C.

The metal catalyst serves to help carbon components present in a gaseous carbon source bind to each other to form a 6-membered ring structure. Specifically, as the metal catalyst, a main catalyst such as nickel or cobalt may be used alone or the main catalyst may be used in the form of a main catalyst-cocatalyst composite catalyst together with a cocatalyst such as molybdenum, vanadium or chromium. Specifically, the metal catalyst may be CoMo or CoV, and one or a mixture of two or more thereof may be used. Further, the cocatalyst may be used in an amount of 0.01 to 1 mole, and specifically 0.05 to 0.5 moles based on 1 mole of the main catalyst.

As the precursor of the metal catalyst which may be used in the preparation of the supported catalyst, a metal salt or metal oxide soluble in water may be used. Specifically, the precursor of the metal catalyst may be a metal salt, a metal oxide or a metal halide including one or two or more metal elements selected from Fe, Ni, Co, Mo, V and Cr, and one or a mixture of two or more thereof may be used. More specifically, one or a mixture of two or more selected from the group consisting of $Co(NO_3)_2 \cdot 6H_2O$, $Co_2(CO)_8$, $[Co_2(CO)_6(t\text{-}BuC\equiv CH)]$, $Cu(OAc)_2$, $Ni(NO_3)_2 \cdot 6H_2O$, $(NH_4)_6Mo_7O_{24} \cdot 4H_2O$, $Mo(CO)_6$, $(NH_4)MoS_4$ and $NH_4VO_3$ may be used.

The precursor of the metal catalyst may be used in the form of an aqueous solution dissolved in water. Here, the concentration of the metal catalyst precursor in the aqueous solution may be suitably controlled in consideration of the impregnation efficiency and the like. Specifically, the concentration of the metal catalyst precursor in the aqueous solution may be in the range of 0.1 to 0.4 g/ml.

Further, a process of mixing the metal catalyst precursor solution and the support may be performed according to a conventional method, and specifically, may be performed by rotation or stirring at a temperature in the range of 45 to 80° C.

Further, during the mixing process, the metal catalyst precursor and the support may be mixed in consideration of the content of the metal catalyst in the supported catalyst to be finally prepared. As the amount of the metal catalyst supported on the supported catalyst increases, the bulk density of the carbon nanotubes prepared using the supported catalyst tends to increase. Accordingly, the metal catalyst may be mixed such that the metal catalyst is supported in an amount of 5 to 30 wt % based on the total weight of the supported catalyst to be finally prepared, considering the bulk density of the carbon nanotubes prepared.

Further, acid may be selectively further used in the addition and mixing of the support in the metal catalyst precursor solution for control of the bulk density of the carbon nanotubes to be finally prepared.

As such, when the acid is further added, the metal catalyst precursor solution may be used in an amount of 3 to 40 moles, more specifically 5 to 30 moles based on 1 mole of the acid. The acid may specifically be citric acid or the like, and one or a mixture of two or more thereof may be used.

Further, after the metal catalyst precursor solution and the support are mixed, a drying process may be selectively performed before the subsequent calcination process. The drying process may be carried out according to a conventional method, specifically, may be carried out by rotary evaporation at a temperature in the range of 40 to 100° C. under vacuum for 3 minutes to 1 hour.

Subsequently, calcination is performed on the mixture of the metal catalyst precursor and the support prepared in the aforementioned manner. The calcination may be carried out at a temperature of 600° C. or less, and specifically in the range of 400° C. to 600° C. in air or an inert atmosphere.

Further, after the drying process and before the calcination process, a preliminary calcination process may be selectively further carried out at a temperature in the range of 250 to 400° C.

Here, considering the efficiency of the reaction, up to 50% of the mixture of the metal catalyst precursor and the support may be impregnated into the support and used immediately before the preliminary calcination process, and the remainder of the mixture immediately after the preliminary calcination process may be impregnated into the support and used.

The carbon nanotubes prepared according to the above-described preparation method have low bulk density and powder resistance, and thus can exhibit excellent dispersibility and conductivity in the preparation of the conductive material dispersed liquid. In addition, carbon nanotubes have high purity, and thus the conductivity in the electrode is increased, and thereby battery performance, and particularly, the output characteristics of batteries at low temperatures can be improved when the carbon nanotubes are applied to electrodes.

Further, in the conductive material dispersed liquid according to an embodiment of the present invention, the dispersant may be a nitrile-based rubber, and more specifically, may be a partially or wholly hydrogenated nitrile butadiene rubber. More specifically, the dispersant includes a structural unit derived from a conjugated diene, a structural unit derived from a hydrogenated conjugated diene and a structural unit derived from an α,β-unsaturated nitrile, and may be a partially hydrogenated nitrile butadiene rubber containing 20 to 65 wt % of the structural unit derived from an α,β-unsaturated nitrile based on the total weight of the rubber.

The partially hydrogenated nitrile butadiene-based rubber may be prepared by copolymerizing α,β-unsaturated nitriles, conjugated dienes and selectively other copolymerizable termonomers, and hydrogenating C=C double bonds in the copolymer thus prepared. Here, the polymerization reaction process and hydrogenation process may be carried out according to a conventional method.

Specific examples of the α,β-unsaturated nitrile usable in the preparation of the partially hydrogenated nitrile butadiene rubber include acrylonitrile, methacrylonitrile or the like, and one or a mixture of two or more thereof may be used.

Specific examples of the conjugated dienes usable in the preparation of the partially hydrogenated nitrile butadiene rubber include conjugated dienes having 4 to 6 carbon atoms such as 1,3-butadiene, isoprene, 2,3-dimethyl-1,3-butadiene and the like, and one or a mixture of two or more thereof may be used.

Further, specific examples of other copolymerizable termonomers which may be selectively used include aromatic vinyl monomers (e.g., styrene, α-methyl styrene, vinyl pyridine, fluoroethyl vinyl ether, etc.), α,β-unsaturated carboxylic acids (e.g., acrylic acid, methacrylic acid, maleic acid, fumaric acid, etc.), esters or amides of α,β-unsaturated carboxylic acids (e.g., methyl (meth)acrylate, ethyl (meth)acrylate, n-dodecyl (meth)acrylate, methoxymethyl (meth)acrylate, hydroxyethyl (meth)acrylate, or polyethylene glycol (meth)acrylate, etc.), anhydrides of α,β-unsaturated dicarboxylic acids (e.g., maleic anhydride, itaconic anhydride, citraconic anhydride, etc.), but are not limited thereto.

In the partially hydrogenated nitrile butadiene rubber prepared according to the aforementioned method, the content ratio of a structural unit derived from an α,β-unsaturated nitrile, a structural unit derived from a conjugated diene, a structural unit derived from a hydrogenated conjugated diene and selectively a structural unit derived from other copolymerizable termonomers which are used may vary within a wide range, and the total sum of the structural units is 100 wt % in each case.

Further, considering the improvement in dispersibility of carbon nanotubes and compatibility with dispersion media, the content of the structural unit derived from an α,β-unsaturated nitrile in the partially hydrogenated nitrile butadiene-based rubber may be in the range of 20 to 65 wt %, and specifically, 30 to 60 wt % based on the total weight of the partially hydrogenated nitrile butadiene-based rubber. When the repeating unit containing an α,β-unsaturated nitrile structure is contained in the aforementioned content range, the dispersibility of carbon nanotubes can be increased, and high conductivity can be imparted even though the amount of the added carbon nanotubes is small.

In the present invention, the content of the repeating unit containing a nitrile structure in the partially hydrogenated nitrile butadiene-based rubber is the weight ratio of the structural unit derived from an α,β-unsaturated nitrile with respect to the total rubber, and the measurement of the content is performed by obtaining a median of the values obtained by measuring the amount of nitrogen generated, converting the bonding amount from the molecular weight of acrylonitrile, and quantifying in accordance with the mill oven method of JIS K 6364.

Further, the content of the structural unit derived from a hydrogenated conjugated diene in the partially hydrogenated nitrile butadiene-based rubber may be in the range of 1 to 30 wt %, and more specifically, 1 to 15 wt % based on the total weight of the partially hydrogenated nitrile butadiene-based rubber. When the structural unit derived from a hydrogenated conjugated diene is contained in the aforementioned amount, the miscibility with the dispersion medium is increased and the dispersibility of carbon nanotubes can be increased.

Further, the partially hydrogenated acrylonitrile-butadiene rubber (H-NBR) may have a weight average molecular weight in the range of 10,000 to 700,000 g/mol, and more specifically in the range of 10,000 to 300,000 g/mol. Further, the partially hydrogenated acrylonitrile-butadiene rubber (H-NBR) may have a polydispersity index (PDI) (a ratio of Mw/Mn, where Mw is a weight average molecular weight and Mn is a number average molecular weight) in the range of 2.0 to 6.0, and specifically 2.0 to 4.0. When the H-NBR has a weight average molecular weight and polydispersity index within the aforementioned ranges, the carbon nanotubes may be uniformly dispersed in the dispersion medium. In the present invention, each of the weight average molecular weight and the number average molecular weight is a polystyrene-equivalent molecular weight analyzed by gel permeation chromatography (GPC).

Further, in the conductive material dispersed liquid according to an embodiment of the present invention, examples of the dispersion medium include amide-based polar organic solvents such as dimethylformamide (DMF), diethylformamide, dimethylacetamide (DMAc), N-methylpyrrolidone (NMP) or the like; alcohols such as methanol, ethanol, 1-propanol, 2-propanol (isopropyl alcohol), 1-butanol (n-butanol), 2-methyl-1-propanol (isobutanol), 2-butanol (sec-butanol), 1-methyl-2-propanol (tert-butanol), pentanol, hexanol, heptanol, octanol or the like; glycols such as ethylene glycol, diethylene glycol, triethylene glycol, propylene glycol, 1,3-propanediol, 1,3-butanediol, 1,5-pentanediol, hexylene glycol or the like; polyhydric alcohols such as glycerin, trimethylol propane, pentaerythritol, sorbitol or the like; glycol ethers such as ethylene glycol monomethyl ether, diethylene glycol monomethyl ether, triethylene glycol monomethyl ether, tetraethylene glycol monomethyl ether, ethylene glycol monoethyl ether, diethylene glycol monoethyl ether, triethylene glycol monoethyl ether, tetraethylene glycol monoethyl ether, ethylene glycol monobutyl ether, diethylene glycol monobutyl ether, triethylene glycol monobutyl ether, tetraethylene glycol monobutyl ether or the like; ketones such as acetone, methyl ethyl ketone, methyl propyl ketone, cyclopentanone or the like; esters such as ethyl acetate, γ-butyllactone, ε-propiolactone and the like, and one or a mixture of two or more thereof may be used. More specifically, the dispersion medium may be an amide-based polar organic solvent considering the effect of improving the dispersibility of the carbon nanotubes and the dispersant.

In the conductive material dispersed liquid having the above-described composition according to an embodiment of the present invention, the contents of the dispersant, carbon nanotubes and dispersion medium may be suitably determined depending on the use of the dispersion liquid.

Specifically, the dispersant may be contained in an amount of 1 to 50 parts by weight based on 100 parts by weight of the carbon nanotubes in order to uniformly disperse the carbon nanotubes in the dispersion liquid. When the content of the dispersant is less than 1 part by weight, it is difficult to uniformly disperse the carbon nanotubes in the dispersion liquid. When the amount exceeds 50 parts by weight, viscosity of the dispersion liquid may increase, causing a decrease in workability. More specifically, the dispersant may be included in an amount of 5 to 20 parts by weight.

Further, the carbon nanotubes may be included in an amount of 1.0 to 33 wt % based on the total weight of the conductive material dispersed liquid. When the carbon nanotubes are included in an amount within the above-described range, electronic conductivity and dispersibility can be well balanced. When the content of carbon nanotubes is out of the above-described range and is less than 1 wt %, for example, the composition for forming an electrode includes a large amount of organic solvent when preparing an electrode of a lithium secondary battery, and as a result, voids in the electrode are increased, a filling rate of an active material is lowered, and thereby battery capacity may decrease. Further, a drying time for removing the organic solvent may be prolonged. Moreover, when the content of carbon nanotubes exceeds 30 wt %, the resistance of the electrode is increased because carbon nanotubes are not well dispersed due to high viscosity.

More specifically, the conductive material dispersed liquid according to an embodiment of the present invention may include the dispersant in an amount of 1 to 50 parts by weight and the dispersion medium in an amount of 200 to 9,900 parts by weight based on 100 parts by weight of the carbon nanotubes. Within the above-described ranges, carbon nanotubes may be uniformly dispersed in the dispersion medium. More specifically, the dispersant may be included in an amount of 5 to 20 parts by weight and the dispersion medium may be included in an amount of 1,000 to 3,500 parts by weight based on 100 parts by weight of the carbon nanotubes.

Further, the conductive material dispersed liquid according to an embodiment of the present invention may further include a dispersion stabilizer to increase stability of the dispersed liquid.

The dispersion stabilizer is adsorbed on the surface of carbon nanotubes to exhibit a lapping effect surrounding the carbon nanotubes, thereby preventing aggregation of the carbon nanotubes. Accordingly, the dispersion stabilizer is preferably excellent in affinity for carbon nanotubes and excellent in miscibility with dispersants and dispersion media. Specifically, in the conductive material dispersed liquid according to an embodiment of the present invention, the dispersion stabilizer may be fluorinated polymers such as polyvinylidene fluoride or polyvinylpyrrolidone, and one or a mixture of two or more thereof may be used.

Further, the dispersion stabilizer may have a weight average molecular weight in the range of 20,000 to 5,000,000 g/mol. When the molecular weight of the dispersion stabilizer is too small and is less than 20,000 g/mol, it is difficult to exhibit a sufficient lapping effect on the carbon nanotubes. When the molecular weight is too large and is more than 5,000,000 g/mol, it is difficult to sufficiently lap the carbon nanotubes due to a decrease in molecular motion of the dispersion stabilizer in the dispersion medium. More specifically, the dispersion stabilizer may have a weight average molecular weight in the range of 70,000 to 2,000,000 g/mol.

Further, the dispersion stabilizer may be used in an amount of 1 to 10 parts by weight based on 100 parts by weight of the carbon nanotubes. When the content of the dispersion stabilizer is too low in comparison with the content of the carbon nanotubes, it is difficult to obtain a sufficient lapping effect, and as a result, aggregation of carbon nanotubes may occur.

The conductive material dispersed liquid having the above-described composition according to an embodiment of the present invention may be prepared by a method including a step (Step 1) of mixing carbon nanotubes and a dispersion medium to prepare a slurry including carbon nanotubes; and a step (Step 2) of mixing the dispersant with the slurry. Here, the type and amount of the carbon nanotubes, dispersant and dispersion medium used are the same as described above.

Further, mixing of the carbon nanotubes and dispersion medium may be carried out by a conventional method, specifically, using a mixing device such as a homogenizer, a bead mill, a ball mill, a basket mill, an induction mill, a universal stirrer, a clear mixer, a TK mixer, etc.

Further, when mixing the carbon nanotubes and dispersion medium, cavitation dispersion treatment may be carried out to improve the mixing property of the carbon nanotubes and dispersion medium, or the dispersibility of the carbon nanotubes in the dispersion medium. The cavitation dispersion treatment is a dispersion treatment method using a shock wave generated by the rupture of vacuum bubbles formed in water when high energy is applied to a liquid, and the carbon nanotubes may be dispersed without deteriorating the properties thereof by the above-described method. Specifically, the cavitation dispersion treatment may be carried out by an ultrasonic wave, a jet mill, or shear dispersion treatment.

The dispersion treatment process may be suitably performed depending on the amount of carbon nanotubes and the type of dispersant. Specifically, when the ultrasonic treatment is performed, the frequency may be in the range of 10 to 150 kHz, the amplitude is in the range of 5 to 100 μm, and the irradiation time may be 1 to 300 minutes. As the ultrasonic wave generating apparatus for performing the ultrasonic treatment process, for example, an ultrasonic homogenizer may be used. Further, when a jet mill process is carried out, the pressure may be 20 to 250 MPa, and may be carried out once or more, specifically, twice or more times. Further, as the jet mill dispersing apparatus, a high pressure wet jet mill or the like may be used.

The temperature during the cavitation dispersion treatment process is not particularly limited, and the cavitation dispersion treatment may be performed at a temperature at which there is no possibility of a change in viscosity of the dispersed liquid due to evaporation of the dispersion medium. Specifically, the cavitation dispersion treatment may be performed at a temperature of 50° C. or less, and more specifically, at a temperature in the range of 15 to 50° C.

Further, the mixing process of the dispersant may be carried out by a conventional mixing or dispersing method, and specifically, may be carried out by a milling method such as ball milling, bead milling, or basket milling, or using a homogenizer, a bead mill, a ball mill, a basket mill, an attrition mill, a universal mill, a clear mixer or a TK mixer.

More specifically, the mixing process may be performed using a milling method using a bead mill. Here, the size of the bead mill may be suitably determined according to the type and amount of the carbon nanotubes, and the type of dispersant, and specifically, the diameter of the bead mill may be in the range of 0.5 to 2 mm.

Further, when the dispersion stabilizer is selectively further used in the preparation of the dispersed liquid, the dispersion stabilizer may also be added in the mixing process of the dispersant. Here, a method of preparing the conductive material dispersed liquid according to an embodiment of the present invention may further include a process of adding a dispersion stabilizer. The type and amount of the dispersion stabilizer used are the same as described above.

The dispersion liquid in which carbon nanotubes are uniformly dispersed in the dispersion medium may be prepared according to the above-described method.

Specifically, in the conductive material dispersed liquid according to an embodiment of the present invention, the carbon nanotubes and the dispersant may be uniformly dispersed in the form of a carbon nanotube-dispersant composite in which the dispersant is introduced on the surface of the carbon nanotube through physical or chemical bonding. More specifically, in the conductive material dispersed liquid, the composite has a particle size distribution of 10 or less, more specifically, in the range of 2 to 6.5 according to the following Equation 3, that is, a narrow particle size distribution, and thus can exhibit excellent uniform dispersibility.

Particle size distribution of carbon nanotube-dispersant composite=$(D_{90}-D_{10})/D_{50}$ [Equation 3]

(in Equation 3 above, $D_{10}$, $D_{50}$ and $D_{90}$ each represent particle sizes on a basis of 10%, 50% and 90% in a particle size distribution of a carbon nanotube-dispersant composite.)

More specifically, under conditions satisfying the particle size distribution described above, $D_{10}$ of the particle size distribution of the composite may be in the range of 1 and 5 μm, $D_{50}$ may be in the range of 3 to 15 μm, and $D_{90}$ may be in the range of 10 to 100 μm, and more specifically, $D_{10}$ may be in the range of 1 to 3 μm, $D_{50}$ may be in the range of 4 to 15 μm, and $D_{90}$ may be in the range of 10 to 30 μm.

In the present invention, the particle sizes $D_{10}$, $D_{50}$ and $D_{90}$ of the composite may be measured using a laser diffraction method, and more specifically, each of the average particle size on the basis of 10%, 50% and 90% in the particle size distribution in a measuring device may be calculated by dispersing the composite in a solvent, and introducing a mixture into a commercially available laser diffraction particle size analyzer (e.g., Microtrac MT 3000) to irradiate an ultrasonic wave of about 28 kHz at an output of 60 W.

Further, the conductive material dispersed liquid may have a viscosity in the range of 1,000 to 20,000 mPa·s when the viscosity is measured at 10 rpm using a Brookfield viscometer. Since the conductive material dispersed liquid has a lower viscosity characteristic than the conventional conductive material dispersed liquid, the conductive material dispersed liquid can exhibit excellent dispersion characteristics when applied for production of electrodes.

As such, the conductive material dispersed liquid according to the present invention can exhibit excellent electrical, thermal and mechanical properties due to uniform dispersion of carbon nanotubes, and workability is improved due to maintenance of low viscosity, and thus the conductive material dispersed liquid may be applied and practically used in various fields. Specifically, the conductive material dispersed liquid may be used for production of electrodes for lithium secondary batteries.

According to another embodiment of the present invention, there are provided a composition for forming an electrode for a lithium secondary battery which includes the above-described conductive material dispersed liquid together with an electrode active material, and an electrode prepared using the composition. Here, the electrode may be a positive electrode or a negative electrode, and more specifically, may be a positive electrode.

Specifically, the composition for forming an electrode of a lithium secondary battery may include the above-described conductive material dispersed liquid, an electrode active material and a binder.

In the composition for forming an electrode of a lithium secondary battery, the conductive material dispersed liquid may be included in an amount of 1 to 50 wt % based on the total weight of the composition for forming an electrode of a lithium secondary battery. When the content of the conductive material dispersed liquid is less than 1 wt %, output characteristics of batteries may be lowered due to a decrease in conductivity and an increase in resistance in an electrode active material layer. When the content exceeds 50 wt %, capacity characteristics may be deteriorated due to a relative decrease in a content of the active material.

In the composition for forming an electrode, the electrode active material may be usually used as a positive or negative electrode active material of a secondary battery.

Specifically, when the composition for forming an electrode is a composition for forming a positive electrode, the electrode active material is a compound capable of reversibly intercalating and deintercalating lithium (a lithiated intercalation compound), and specifically, may be a positive electrode active material of a lithium transition metal oxide including a transition metal such as cobalt, manganese, nickel, or aluminum, and lithium.

Further, when the composition for forming an electrode is a composition for forming a negative electrode, the electrode active material is a compound capable of reversibly intercalating and deintercalating lithium, and may be a negative electrode active material of carbonaceous materials such as artificial graphite, natural graphite, graphitized carbon fiber and amorphous carbon; metal compounds capable of alloying with lithium, such as Si, Al, Sn, Pb, Zn, Bi, In, Mg, Ga, Cd, Si alloys, Sn alloys or Al alloys; a metal oxide capable of doping and dedoping lithium such as $SiO_x$ ($0<x<2$), $SnO_2$, vanadium oxide and lithium vanadium oxide; or composites including the metal compound and the carbonaceous material such as a Si—C composite or a Sn—C composite, and one or a mixture of two or more thereof may be used. Further, a metal lithium thin film may be used as the negative electrode active material. Further, both low-crystalline carbon and highly-crystalline carbon may be used as the carbon material. Typical examples of the low-crystalline carbon include soft carbon and hard carbon, and typical examples of the highly-crystalline carbon include amorphous, platy, scaly, spherical or fibrous natural graphite or artificial graphite, kish graphite, pyrolytic carbon, mesophase pitch based carbon fiber, meso-carbon microbeads, mesophase pitches, and high-temperature calcined carbon such as petroleum- or coal tar pitch-derived cokes.

The electrode active material may be contained in an amount of 70 to 99.5% by weight with respect to the total weight of the composition for forming an electrode based on solid content. When the content of the electrode active material is less than 70 wt %, the capacity may decrease. When the content exceeds 99.5 wt %, adhesive strength to an electrode current collector is lowered, and conductivity is reduced due to a decrease in the relative content of the binder and the conductive material.

Further, the binder may be included to enhance adhesion between the electrode active material particles and adhesive strength between the electrode active material and the current collector.

Specific examples of the binder include polyvinylidene fluoride (PVDF), a polyvinylidene fluoride-hexafluoropropylene copolymer (PVDF-co-HFP), polyvinyl alcohol, polyacrylonitrile, carboxymethylcellulose (CMC), starch, hydroxypropylcellulose, regenerated cellulose, polyvinylpyrrolidone, tetrafluoroethylene, polyethylene, polypropylene, an ethylene-propylene-diene monomer (EPDM), a sulfonated EPDM, styrene butadiene rubber (SBR), fluorine rubber, or various copolymers thereof, and one or a mixture of two or more thereof may be used. The binder may be included in an amount of 0.09 to 30 wt % based on the total weight of the composition for forming an electrode.

Further, the composition for forming an electrode may further include a solvent for mixing and dispersing the above-described electrode active material, binder, and the like.

The solvent may be any solvent commonly used in the related filed, and examples thereof include dimethyl sulfoxide (DMSO), isopropyl alcohol, N-methylpyrrolidone (NMP), acetone, water or the like, and one or a mixture of two or more thereof may be used. The amount of the solvent used may be sufficient to have a viscosity capable of exhibiting excellent thickness uniformity when the electrode active material and the binder are dissolved or dispersed, and applied to produce an electrode, in consideration of the application thickness of the slurry and the production yield.

Further, the electrode according to an embodiment of the present invention, which is prepared by using the composition for forming an electrode, may be prepared using a conventional method except for forming an electrode active material layer using the composition for forming an electrode.

Specifically, the electrode may be produced by applying the composition for forming an electrode to a current collector and drying, or laminating a film obtained by casting the composition for forming an electrode on a separate support and then peeling off the composition from the support on a current collector.

The current collector is not particularly limited as long as it has electrical conductivity without causing chemical changes in the battery, and examples thereof include copper, stainless steel, aluminum, nickel, titanium, calcined carbon, or aluminum or stainless steel having a surface treated with carbon, nickel, titanium, silver or the like. Further, the current collector may generally have a thickness in the range of 3 to 500 μm, and adhesive strength of the positive electrode active material can be increased by forming fine irregularities on the surface of the current collector. For example, the current collector may be used in various forms such as a film, a sheet, a foil, a net, a porous material, a foam, a nonwoven fabric, etc.

According to another embodiment of the present invention, there is provided an electrochemical device including the electrode. Specifically, the electrochemical device may be a battery, a capacitor, and the like, and more specifically, may be a lithium secondary battery.

Further, in the lithium secondary battery, a separator separates the negative electrode and the positive electrode and provides a passage for lithium ions. Any separator may be used without particular limitation as long as it is used as a separator in a lithium secondary battery, and particularly, a separator having low resistance to electrolyte ion migration and excellent electrolyte wettability is preferred. Specifically, a porous polymer film, for example, a porous polymer film formed of a polyolefin-based polymer such as an ethylene homopolymer, a propylene homopolymer, an ethylene/butene copolymer, an ethylene/hexene copolymer and an ethylene/methacrylate copolymer, or a laminated structure of two or more thereof may be used. Further, nonwoven fabrics formed of conventional porous nonwoven fabrics such as high-melting-point glass fibers, polyethylene terephthalate fibers and the like may be used. Furthermore, a coated separator containing a ceramic component or a polymer material may be used to ensure heat resistance or mechanical strength, and may be selectively used in a single layer or a multi-layer structure.

Further, examples of the electrolyte used in the present invention include organic liquid electrolytes, inorganic liquid electrolytes, solid polymer electrolytes, gel-type polymer electrolytes, solid inorganic electrolytes, molten inorganic electrolytes and the like which are usable in the production of lithium secondary batteries, but are not limited thereto.

Specifically, the electrolyte may include organic solvents and lithium salts.

As the organic solvent, any organic solvent may be used without particular limitation as long as it can act as a medium through which ions involved in the electrochemical reaction of the battery can move. Specific examples of the organic solvent include ester-based solvents such as methyl acetate, ethyl acetate, γ-butyrolactone, ε-caprolactone and the like; ether-based solvents such as dibutyl ether or tetrahydrofuran; ketone-based solvents such as cyclohexanone; aromatic hydrocarbon-based solvents such as benzene and fluorobenzene; carbonate-based solvents such as dimethylcarbonate (DMC), diethylcarbonate (DEC), methylethylcarbonate (MEC), ethylmethylcarbonate (EMC), ethylene carbonate (EC), propylene carbonate (PC) and the like; alcohol-based solvents such as ethyl alcohol and isopropyl alcohol; nitriles such as R—CN (R is a linear, branched or cyclic hydrocarbon group having 2 to 20 carbon atoms, which may include a double bond aromatic ring or ether bond); amides such as dimethylformamide; dioxolanes such as 1,3-dioxolane; sulfolanes; etc. Among these, a carbonate-based solvent is preferred, and a mixture of a cyclic carbonate (e.g., ethylene carbonate or propylene carbonate) having high ionic conductivity and a high dielectric constant capable of increasing the charging/discharging performance of the battery and a linear carbonate-based compound having low viscosity (e.g., ethylmethyl carbonate, dimethyl carbonate or diethyl carbonate) is more preferred. In this case, when a cyclic carbonate and a chain carbonate are mixed in a volume ratio of about 1:1 to 1:9, the performance of the electrolyte may be excellent.

The lithium salt may be used without particular limitation as long as it is a compound capable of providing lithium ions used in a lithium secondary battery. Specific examples of the lithium salt include $LiPF_6$, $LiClO_4$, $LiAsF_6$, $LiBF_4$, $LiSbF_6$, $LiAlO_4$, $LiAlCl_4$, $LiCF_3SO_3$, $LiC_4F_9SO_3$, $LiN(C_2F_5SO_3)_2$, $LiN(C_2F_5SO_2)_2$, $LiN(CF_3SO_2)_2$, $LiCl$, $LiI$, $LiB(C_2O_4)_2$, etc. The concentration of the lithium salt used is preferably in the range of 0.1 to 2.0M. When the concentration of the lithium salt is within the above-described range, the electrolyte has suitable conductivity and viscosity, and thus can exhibit excellent electrolyte performance and lithium ions can move efficiently.

In addition to the electrolyte compositions, for example, the electrolyte may include one or more additives such as a haloalkylene carbonate-based compound such as difluoroethylene carbonate, pyridine, triethylphosphite, triethanolamine, cyclic ethers, ethylenediamine, n-glyme, hexaphosphoric triamide, nitrobenzene derivatives, sulfur, quinone imine dyes, N-substituted oxazolidinones, N,N-substituted imidazolidine, ethylene glycol dialkyl ether, ammonium salts, pyrrole, 2-methoxyethanol, aluminum trichloride and the like, for the purpose of improving the lifetime characteristics of the battery, suppressing the reduction of the battery capacity, and improving the discharge capacity of the battery. Here, the additive may be included in an amount of 0.1 to 5 wt % based on the total weight of the electrolyte.

A lithium secondary battery including an electrode prepared using the conductive material dispersed liquid according to the present invention as described above can stably exhibit excellent discharge capacity, output characteristics and an excellent capacity retention ratio due to uniform dispersion of the conductive material in the electrode. As a result, the lithium secondary battery is useful in the fields of portable devices such as cellular phones, notebook computers, digital cameras and the like, and electric vehicles such as hybrid electric vehicles (HEV).

According to another embodiment of the present invention, there are provided a battery module including the lithium secondary battery as a unit cell and a battery pack including the battery module.

The battery module or battery pack may be used as a power of medium- and large-sized devices of one or more of a power tool; electric cars including an electric vehicle (EV), a hybrid electric vehicle, and a plug-in hybrid electric vehicle (PHEV); or a power storage system.

MODES OF THE INVENTION

Now, the present invention will be described in more detail with reference to the following examples. These examples are provided only for illustration of the present invention and should not be construed as limiting the scope and spirit of the present invention.

Example 1-1 and Comparative Examples 1-1 and 1-2: Preparation of Carbon Nanotubes 2,424 g of $Co(NO_3)_2 \cdot 6H_2O$ and $NH_4VO_3$ (Co/V, a molar ratio of 10:1) as precursor materials of Co and V was added to 2,000 ml of water to prepare a clear aqueous solution in Flask A. Separately, 2,000 g of an alumina support obtained by subjecting aluminum hydroxide ($Al(OH)_3$) as an aluminum-based support precursor to primary calcination at the temperature shown in Table 1 for 4 hours was prepared in Flask B. 4,424 g of the Flask A solution was added to Flask B to have a Co/V of 30 moles when 2,000 g of the alumina support was converted into 100 on a molar basis. Further, citric acid was added such that Co, relative to 1 mole of citric acid, was included at the number of moles shown in the following Table 1, and the weight of the resultant mixture was measured. Stirring was performed in a thermostatic chamber at 60° C. for 5 minutes, and a mixture was aged in order to sufficiently support a graphitized catalyst metal precursor. While maintaining the above temperature, the aged mixture was vacuum-dried by rotating at 80 rpm. After drying, the weight was measured to measure the amount of moisture removed (about 14.1 wt %). The resultant dry reaction product was subjected to secondary calcination at the temperature shown in Table 1 for 4 hours to prepare a supported catalyst.

Carbon nanotubes were synthesized in a laboratory-scale fixed-bed reactor using the supported catalyst for synthesizing carbon nanotubes prepared as above. Specifically, the supported catalyst for synthesizing carbon nanotubes thus prepared was mounted at the center of a quartz tube having an inner diameter of 55 mm, and then heated to 670° C. in a nitrogen atmosphere and maintained. Then, 180 ml per minute of nitrogen, hydrogen, and ethylene gas mixed at a volume ratio of 1:1:1 was allowed to flow to perform a reaction for 1 hour to synthesize bundle-type carbon nanotubes.

TABLE 1

| | Primary calcination temperature (° C.) | Co (moles) | Secondary calcination temperature (° C.) |
|---|---|---|---|
| Example 1-1 | 450 | 23 | 650 |
| Comparative Example 1-1 | 450 | 5.8 | 650 |
| Comparative Example 1-2 | 400 | 23 | 675 |

Experimental Example 1-1: Evaluation of Morphology of Carbon Nanotubes

Figure 2:
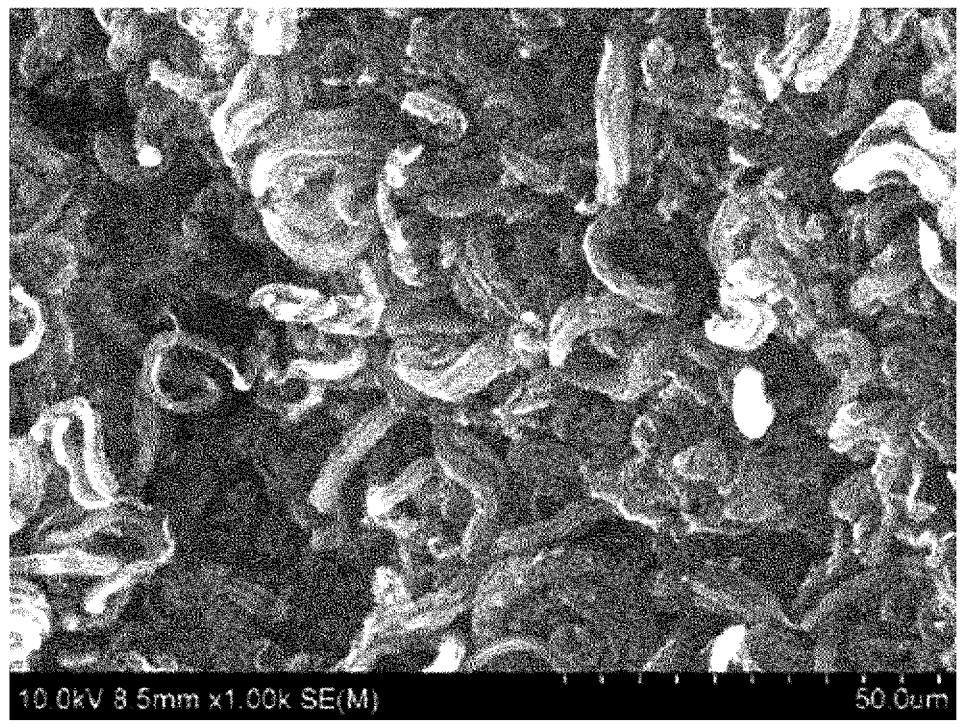
Figure 3:
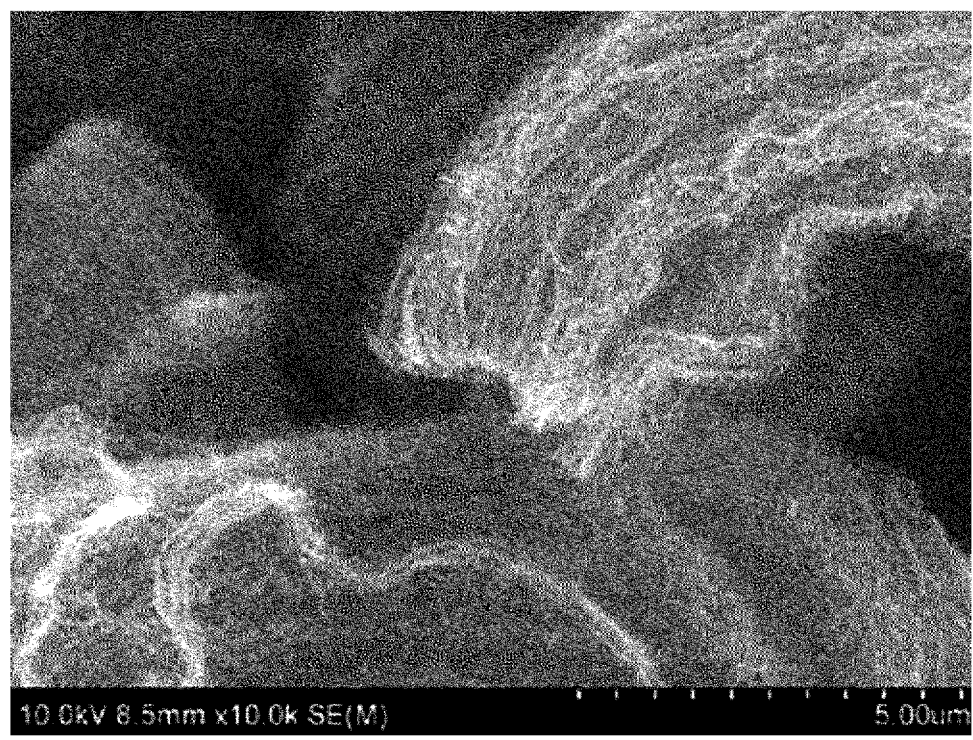
Figure 4:
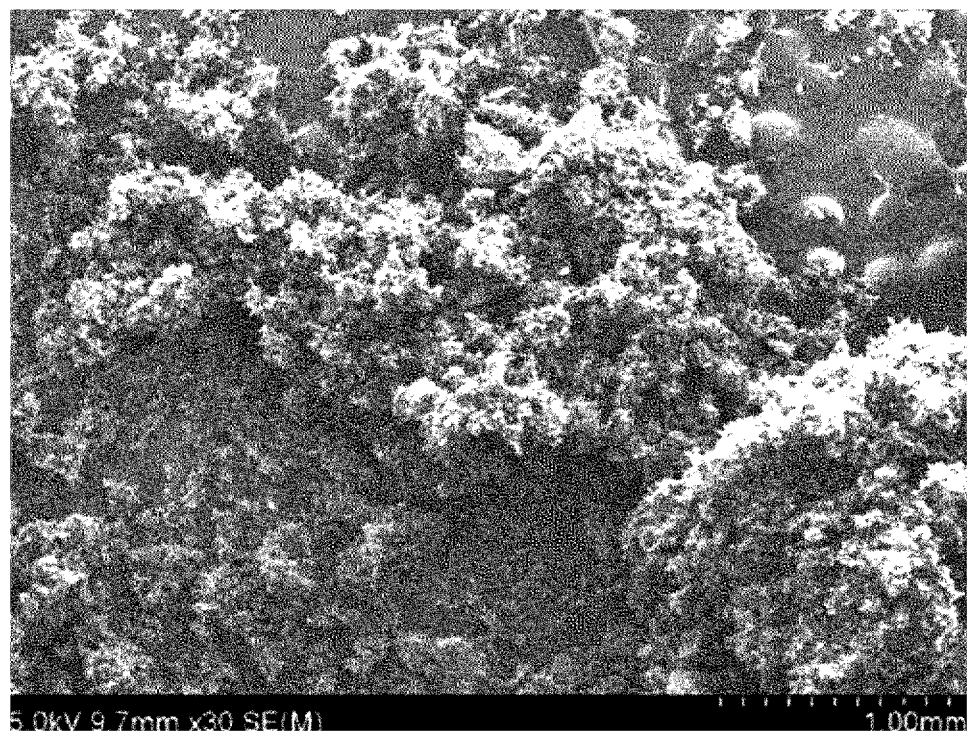
FIGS. 4 to 6 show pictures of carbon nanotubes of Comparative Example 1-1 observed at different observation magnifications using a scanning electron microscope.
Figure 5:
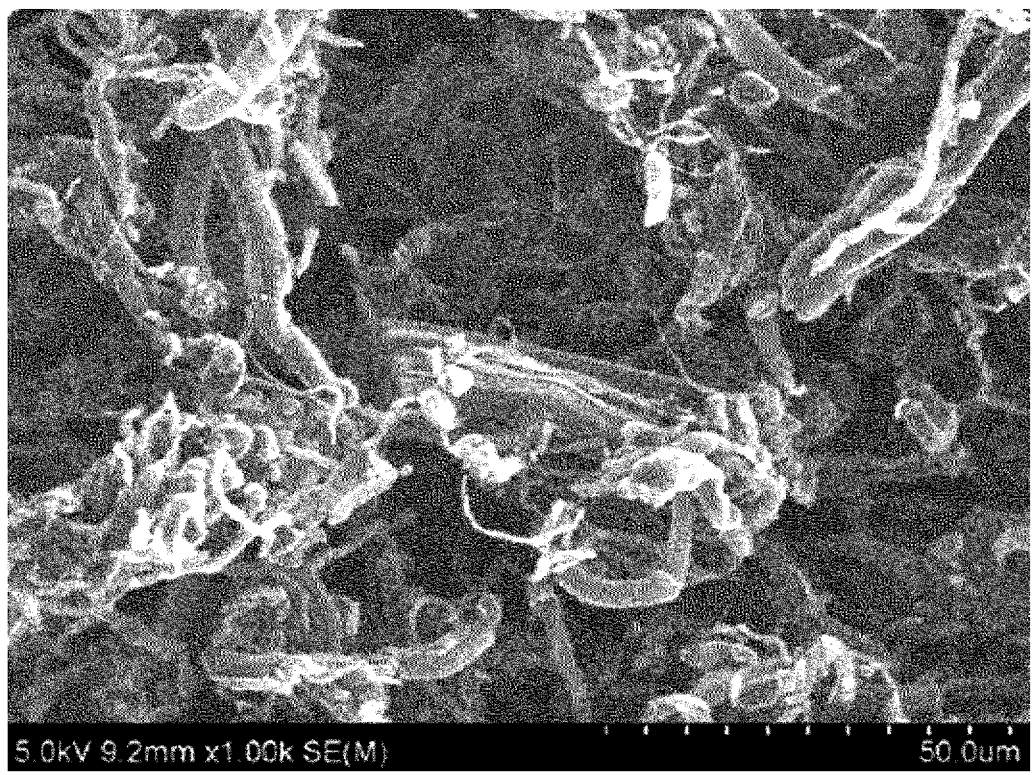
Figure 6:
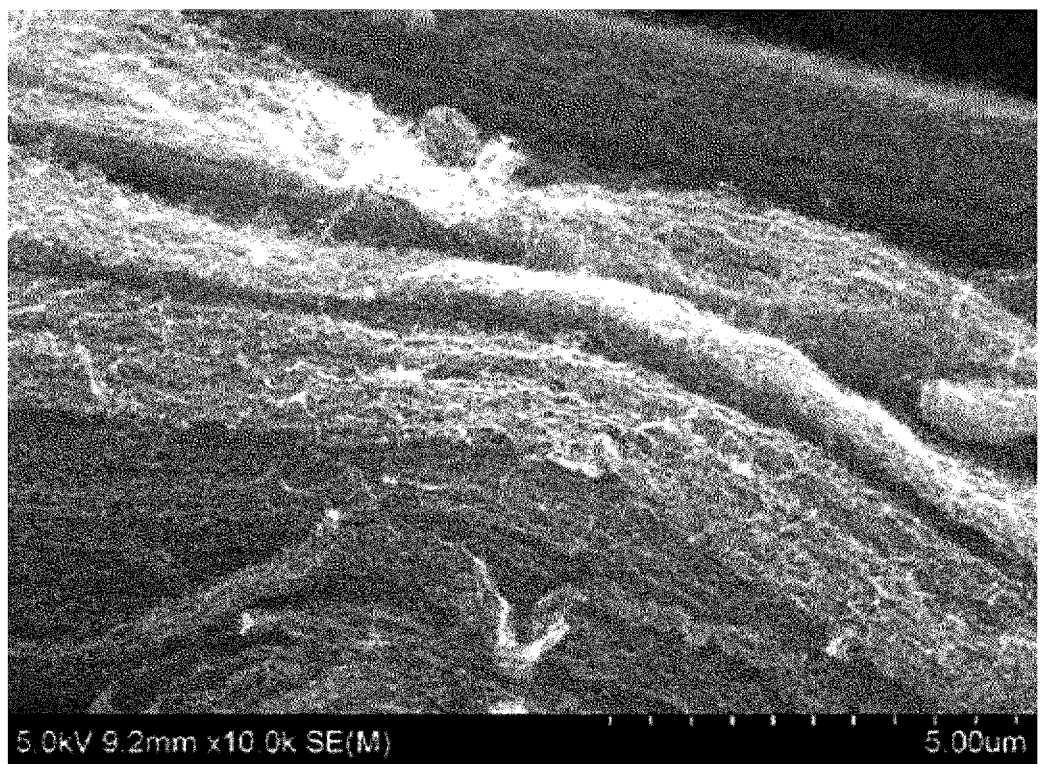
Figure 7:
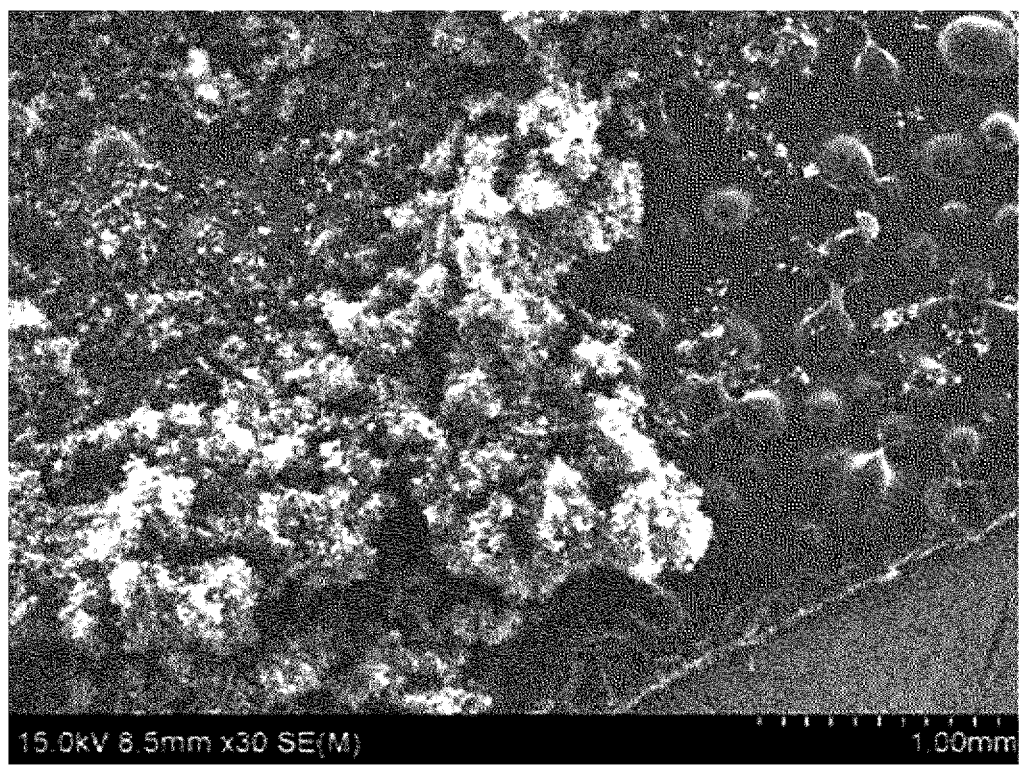
FIGS. 7 to 9 show pictures of carbon nanotubes of Comparative Example 1-2 observed at different observation magnifications using a scanning electron microscope.
Figure 8:
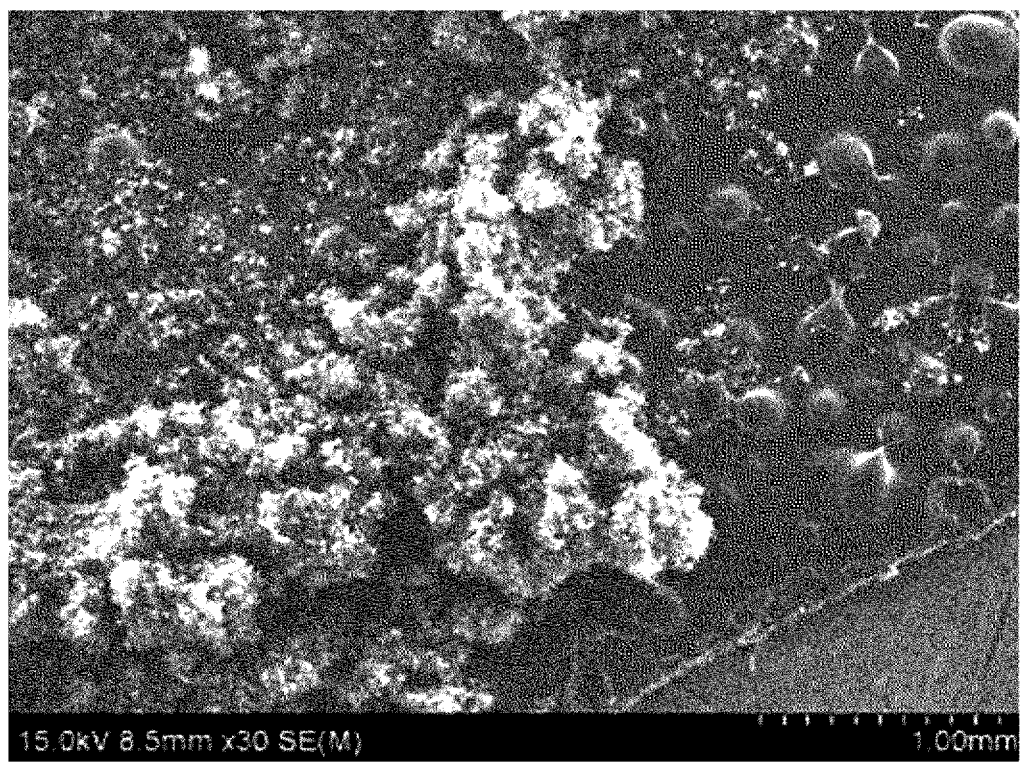
Figure 9:
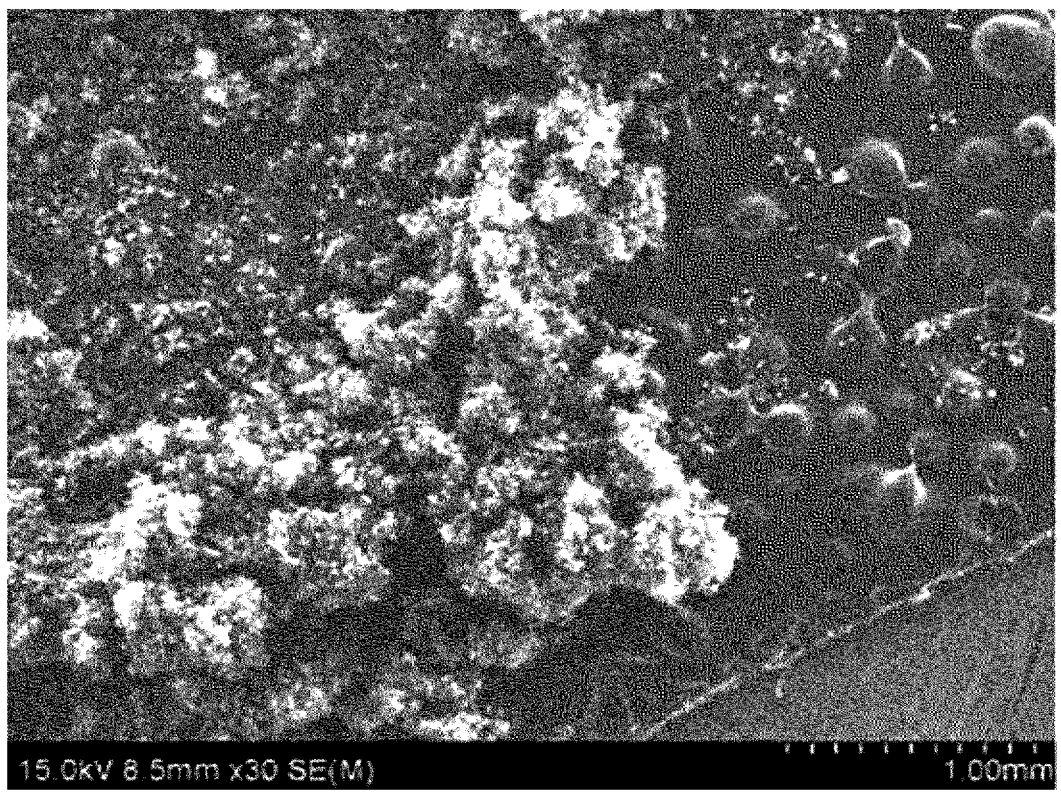

The carbon nanotubes of Example 1-1, and Comparative Examples 1-1 and 1-2 were observed using a scanning electron microscope (SEM). The results of observing the carbon nanotubes of Example 1-1 are shown in FIGS. 1 to 3. The results of observing the carbon nanotubes of Comparative Example 1-1 are shown in FIGS. 4 to 6. The carbon nanotubes prepared in Comparative Example 1-2 are shown in FIGS. 7 to 9.

As a result of the measurement, it can be confirmed that the carbon nanotubes of Example 1-1 and Comparative Examples 1-1 and 1-2 were bundle-type structures having an average particle diameter ($D_{50}$) of 100 μm or less at the same level. However, it can be confirmed that the carbon nanotube unit of Example 1-1 has a longer unit length and higher linearity than the carbon nanotubes of Comparative Examples 1-1 and 1-2.

Experimental Example 1-2: Evaluation of Characteristics of Carbon Nanotubes (1)

Each of the average diameters and lengths of the carbon nanotube units, and the shape of the secondary structure, particle size, ID/IG ratio, purity, powder resistance, BET specific surface area, bulk density and true density of the carbon nanotubes were measured in the following manner for the carbon nanotubes of Example 1-1 and Comparative Examples 1-1 and 1-2, and the results are shown in Table 2.

1) Secondary structure and particle size: the particle size and the shape of the secondary structure of the carbon nanotubes were observed using a scanning electron microscope.
2) Average diameter: the average diameter of carbon nanotube unit was measured using an SEM and BET.
3) Average length: the average length of carbon nanotube unit was measured using an SEM and BET.
4) Crystallinity (ID/IG ratio): the average value and standard deviation were obtained from a ratio (ID/IG) of a maximum peak intensity (ID) of a D band at 1,340 cm$^{-1}$ to 1,360 cm$^{-1}$ to a maximum peak intensity (IG) of a G band at 1,575 cm$^{-1}$ to 1,600 cm$^{-1}$ obtained by Raman spectroscopy using a laser having a wavelength of 514.5 nm.
5) Purity: the purity of carbon nanotubes was measured by an ash test.
6) Powder resistance: the powder was filled in an insulating mold with a diameter of 1 mm and pressed, the surface current and voltage were measured with four probes, and the correction factor was applied to calculate the volume resistance at a pressure of 62 MPa.
7) BET specific surface area: the BET specific surface area was calculated from the adsorption amount of nitrogen gas at a liquid nitrogen temperature (77K) using BELSORP-mini II manufactured by BEL JAPAN, INC.
8) Bulk density: the powder was filled in a 25 ml container whose weight was known, the weight was measured, and the bulk density was measured by conversion of the density.
9) True density: the true density was measured using a Pycnometer (AccuPyc II 1340).

TABLE 2

| | Example 1-1 | Comparative Example 1-1 | Comparative Example 1-2 |
|---|---|---|---|
| Average diameter of carbon nanotube unit (nm) | 11 | 12 | 11 |
| Average length of carbon nanotube unit (μm) | 100 | 100 | 100 |
| Shape of secondary structure of carbon nanotubes | Bundle type | Bundle type | Bundle type |
| Average particle size of secondary structure of carbon nanotubes (μm) | ≤100 | ≤100 | ≤100 |
| ID/IG ratio   Average | 0.95 | 0.72 | 1.63 |
| Standard deviation (%) | 1.64 | 2.12 | 4.71 |
| Powder resistance (Ω · cm, at 62 MPa) | 0.008 | 0.0216 | 0.0135 |
| BET specific surface area (m$^2$/g) | 249 | 245 | 238 |
| Bulk density (kg/m$^3$) | 23 | 35 | 38 |
| True density (kg/m$^3$) | 1,937 | 2,050 | 1,872 |
| −1.0 X (X: bulk density) | −23 | −35 | −38 |
| 10logR (R: powder resistance) | −20.969 | −16.655 | −18.696 |
| −0.6 X (X: bulk density) | −13.8 | −21 | −22.8 |

As shown in Table 2, the carbon nanotubes of Example 1-1 had a higher purity and specific surface area than the carbon nanotubes of Comparative Examples 1-1 and 1-2, while the bulk density and a powder resistance of the carbon nanotubes of Example 1-1 were lower than those of the carbon nanotubes of Comparative Examples 1-1 and 1-2. Further, the carbon nanotubes of Example 1-1 satisfied Equation 1, but the carbon nanotubes of Comparative Examples 1-1 and 1-2 did not satisfy Equation 1.

Experimental Example 1-3: Evaluation of Characteristics of Carbon Nanotubes (2)

Figure 10:
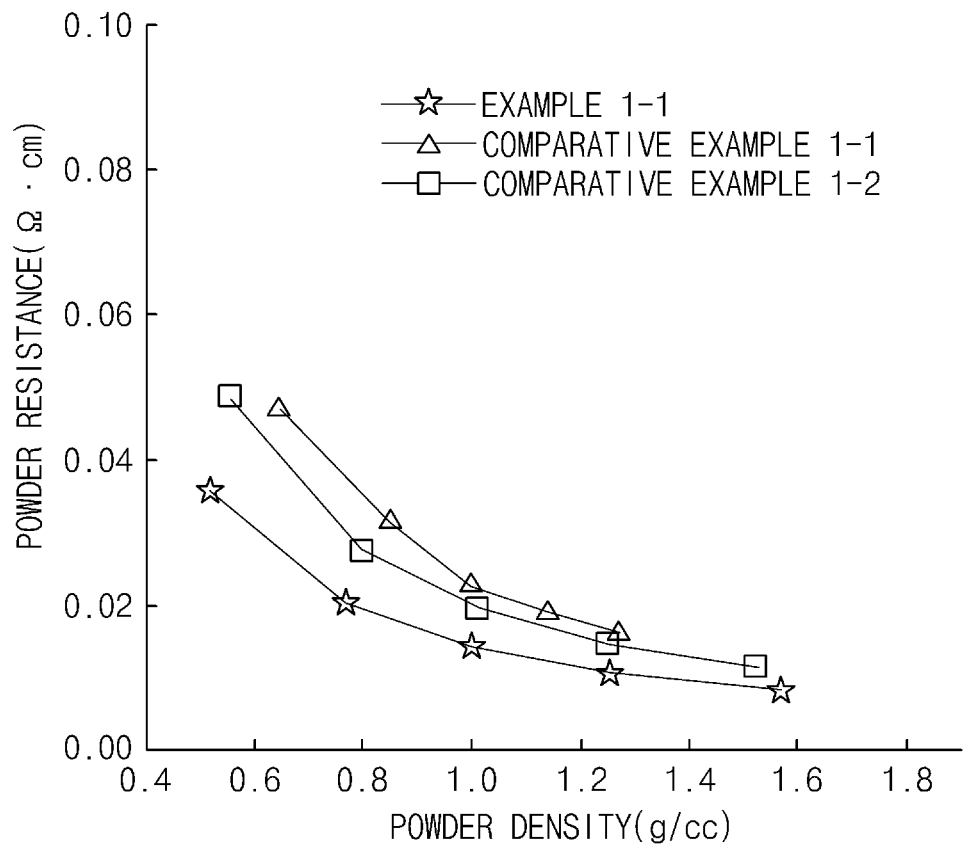
FIG. 10 is a graph showing a result of observing a change in powder resistance according to a powder density of carbon nanotubes of Example 1-1, Comparative Examples 1-1 and 1-2.

The carbon nanotubes of Example 1-1, Comparative Examples 1-1 and 1-2 were observed for changes in the powder resistance according to the powder density of the carbon nanotubes of Example 1-1 and Comparative Examples 1-1 and 1-2, and the results are shown in Table 3 and FIG. 10.

*Powder resistance: the powder of the carbon nanotubes was filled in an insulating mold with a diameter of 1 mm and pressed, the surface current and voltage were measured with four probes, and the correction factor was applied to calculate the powder density and powder resistance according to pressure.

powder density is lower than that of Example 1-1 when the applied pressure is high. This is seen as a difference in the material properties of the carbon nanotubes of Example 1-1, and Comparative Examples 1-1 and 1-2.

TABLE 3

| Classification | | Pressure (MPa) | | | | |
| --- | --- | --- | --- | --- | --- | --- |
| | | 13 | 25 | 37 | 50 | 62 |
| Example 1-1 | Powder resistance ($\Omega \cdot cm$) | 0.0357 | 0.0203 | 0.0143 | 0.0107 | 0.0080 |
| | Powder density (g/cc) | 0.52 | 0.77 | 1.00 | 1.25 | 1.57 |
| | $-1.0$ X 10logR | $-14.473$ | $-16.925$ | $-23.0$ $-18.446$ | $-19.706$ | $-20.969$ |
| | $-0.6$ X | | | $-13.8$ | | |
| Comparative Example 1-1 | Powder resistance ($\Omega \cdot cm$) | 0.0473 | 0.0357 | 0.0295 | 0.0235 | 0.0216 |
| | Powder density (g/cc) | 0.64 | 0.85 | 1.00 | 1.14 | 1.27 |
| | $-1.0$ X 10logR | $-13.251$ | $-14.473$ | $-34.0$ $-15.301$ | $-16.289$ | $-16.655$ |
| | $-0.6$ X | | | $-21$ | | |
| Comparative Example 1-2 | Powder resistance ($\Omega \cdot cm$) | 0.0489 | 0.0277 | 0.0195 | 0.0157 | 0.0135 |
| | Powder density (g/cc) | 0.55 | 0.80 | 1.00 | 1.25 | 1.52 |
| | $-1.0$ X 10logR | $-13.106$ | $-15.575$ | $-38.0$ $-17.099$ | $-18.041$ | $-18.696$ |
| | $-0.6$ X | | | $-22.8$ | | |

R: powder density (the fourth decimal place was discarded in the value of 10logR.)
X: bulk density Referring to Table 3 and FIG. 10, it can be seen that, when a pressure was 13 to 62 MPa, the carbon nanotubes of Example 1-1 have a powder resistance in the range of 0.0080 $\Omega \cdot cm$ to 0.0357 $\Omega \cdot cm$, and satisfy Equation 1. The carbon nanotubes of Example 1-1 exhibited a lower powder resistance than the carbon nanotubes of Comparative Examples 1-1 and 1-2 in the same powder density range. On the other hand, the carbon nanotubes of Comparative Examples 1-1 and 1-2 did not satisfy the aforementioned mathematical Equation.

Further, in the case of Comparative Examples 1-1 and 1-2, it can be seen that the powder density is higher than that of Example 1-1 when the applied pressure is low, and the Examples 2-1 to 2-6, Comparative Examples 2-1 and 2-2: Preparation of Conductive Material Dispersed Liquid 5 parts by weight of the conductive material described in the following Table 4 and 1.0 part by weight of the dispersant described in the following Table 4 were added to 94.0 parts by weight of a solvent of N-methylpyrrolidone (NMP) as a dispersion medium, and the mixture was prepared by mixing for 60 minutes using a homogeneous mixer (manufactured by VMA, model name: LC55, impeller rotating speed: 3,000 rpm). The mixture was dispersed for 60 minutes using a NETZSCH bead mill (manufactured by NETZSCH, model name: Minicer, bead size: 1 mm, bead rotation speed: 3,000 rpm) to obtain a conductive material dispersed liquid.

TABLE 4

| | | Dispersant Hydrogenated nitrile butadiene-based rubber | | | | |
| --- | --- | --- | --- | --- | --- | --- |
| Classification | Conductive material | Repeating unite of structure derived from α,β-unsaturated nitrile (wt %) | Repeating unit of structure derived from hydrogenated conjugated diene (wt %) | Repeating unit derived from copoly-merizable monomer (wt %) | Weight average molecular weight (g/mol) | Polydispersity index (PDI) |
| Example 2-1 | Example 1-1 | 54 | 63 | 0 | 260,000 | 2.9 |
| Example 2-2 | Example 1-1 | 37 | 63 | 0 | 200,000 | 2.7 |
| Example 2-3 | Example 1-1 | 37 | 63 | 0 | 300,000 | 3.3 |
| Example 2-4 | Example 1-1 | 37 | 44 | 35 | 400,000 | 0.3 |
| Example 2-5 | Example 1-1 | 21 | 63 | 10 | 480,000 | 2.2 |

TABLE 4-continued

| Example 2-6 | Example 1-1 | | Polyvinylpyrrolidone | | 400,000 | — |
| Comparative Example 2-1 | Comparative Example 1-1 | 37 | 63 | 0 | 260,000 | 2.9 |
| Comparative Example 2-2 | Comparative Example 1-2 | 37 | 63 | 0 | 260,000 | 2.9 |

*Repeating unit of structure derived from α,β-unsaturated nitrile:

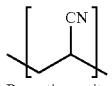

Repeating unit of structure derived from hydrogenated conjugated diene:

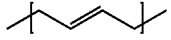

Repeating unit of structure derived from conjugated diene:

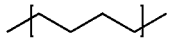

Experimental Example 2-1: Evaluation of Characteristics of Conductive Material Dispersed Liquid (1)

The particle size distribution and the viscosity of the carbon nanotube-dispersant composites in the conductive material dispersed liquids prepared in Examples 2-1 to 2-6 and Comparative Examples 2-1 and 2-2 were measured. The results are shown in the following Table 5.

Particle size distribution: samples were introduced into a laser diffraction particle size analyzer (for example, Microtrac MT 3000) to irradiate an ultrasonic wave of about 28 kHz at an output of 60 W, and then the average particle size $D_{10}$ on the basis of 10% in the particle size distribution, the average particle size $D_{50}$ on the basis of 50% in the particle size distribution and the average particle size $D_{90}$ on the basis of 90% in the particle size distribution in the measurement device each were calculated.

BF viscosity: the viscosity at 10 rpm was measured using a Brookfield viscometer.

TABLE 5

| | Particle size distribution of carbon nanotube-dispersant composite | | | | BF viscosity (mPa · s) |
|---|---|---|---|---|---|
| | $(D_{90}-D_{10})/D_{50}$ | $D_{10}$ (μm) | $D_{50}$ (μm) | $D_{90}$ (μm) | |
| Example 2-1 | 2.02 | 1.60 | 4.80 | 11.30 | 12,800 |
| Example 2-2 | 2.15 | 1.45 | 4.30 | 10.69 | 10,200 |
| Example 2-3 | 2.01 | 1.72 | 5.13 | 12.31 | 13,600 |
| Example 2-4 | 3.36 | 1.98 | 5.79 | 21.43 | 16,500 |
| Example 2-5 | 5.96 | 2.11 | 5.31 | 25.79 | 18,900 |
| Example 2-6 | 2.16 | 1.15 | 5.12 | 12.24 | 4,500 |
| Comparative Example 2-1 | 7.88 | 1.80 | 5.13 | 42.24 | 12,000 |
| Comparative Example 2-2 | 6.61 | 1.45 | 7.90 | 53.70 | 21,000 |

Referring to Table 5, the carbon nanotube-dispersant composites in the conductive material dispersed liquids of Examples 2-1 to 2-6 satisfied a particle size distribution according to Equation 3. However, the carbon nanotube-dispersant composites in the conductive material dispersed liquids of Comparative Examples 2-1 and 2-2 did not satisfy a particle size distribution according to Equation 3.

As a result, it can be seen that the carbon nanotube-dispersant composites forming the conductive material dispersed liquid of Examples 2-1 to 2-6 have a uniform particle size.

Experimental Example 2-2: Evaluation of Characteristics of Conductive Material Dispersed Liquid (2)

Figure 11:
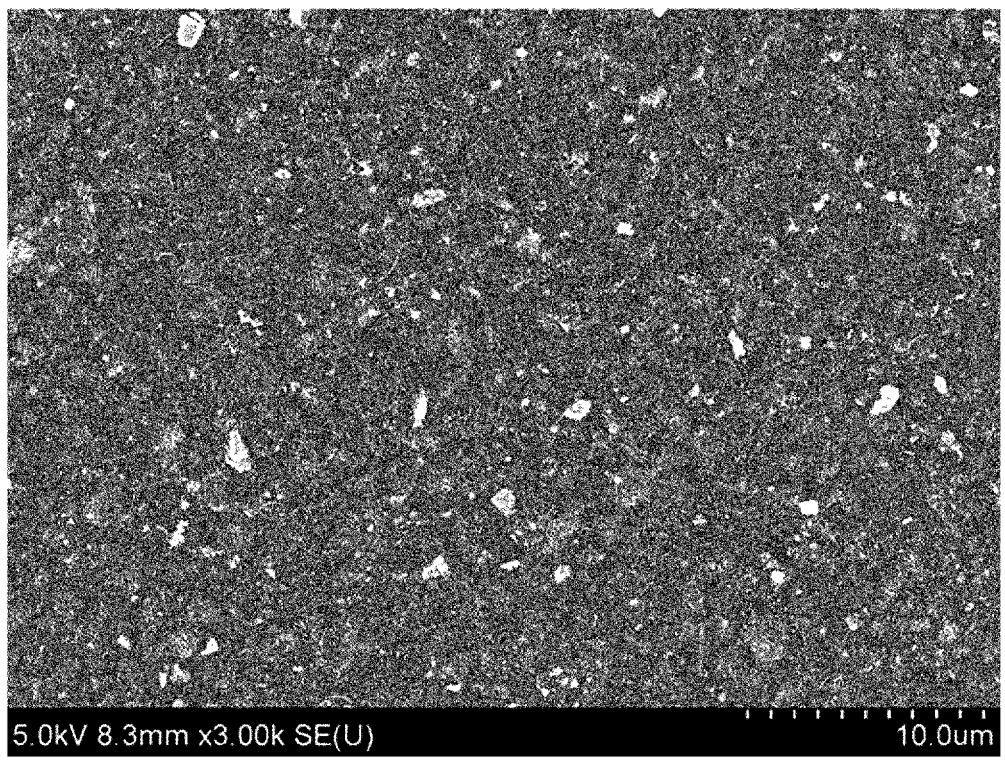
FIG. 11 shows a picture of a conductive material dispersed liquid of Example 2-1 observed using a scanning electron microscope.
Figure 12:
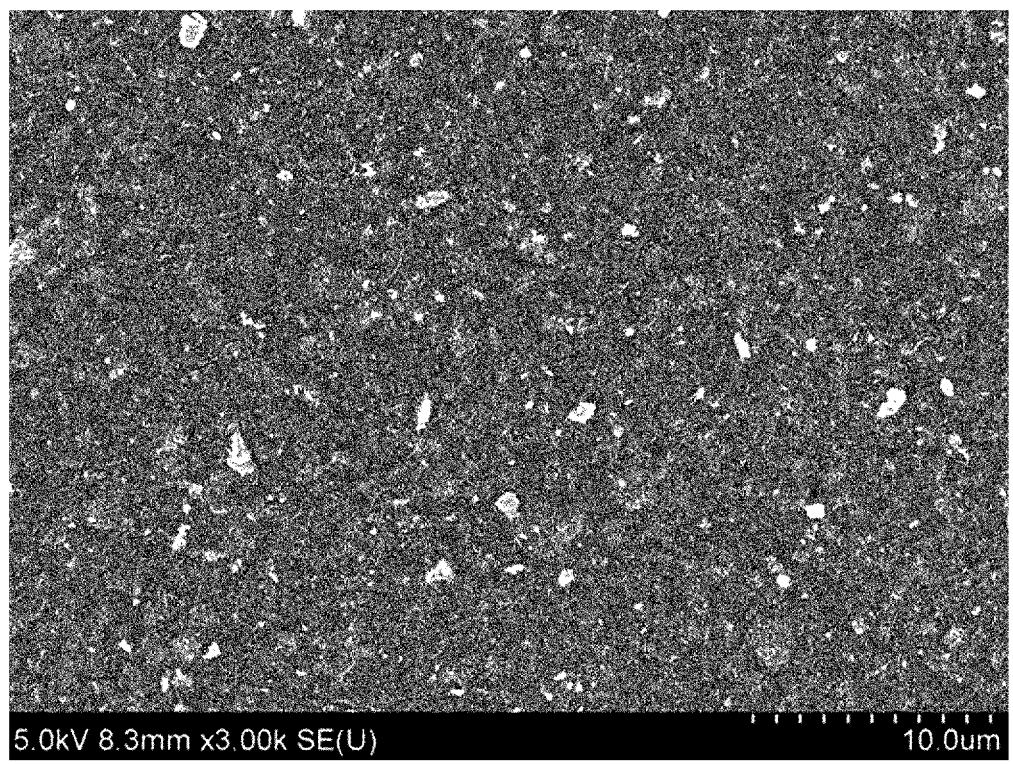
FIG. 12 shows a picture of a conductive material dispersed liquid of Example 2-2 observed using a scanning electron microscope.
Figure 13:
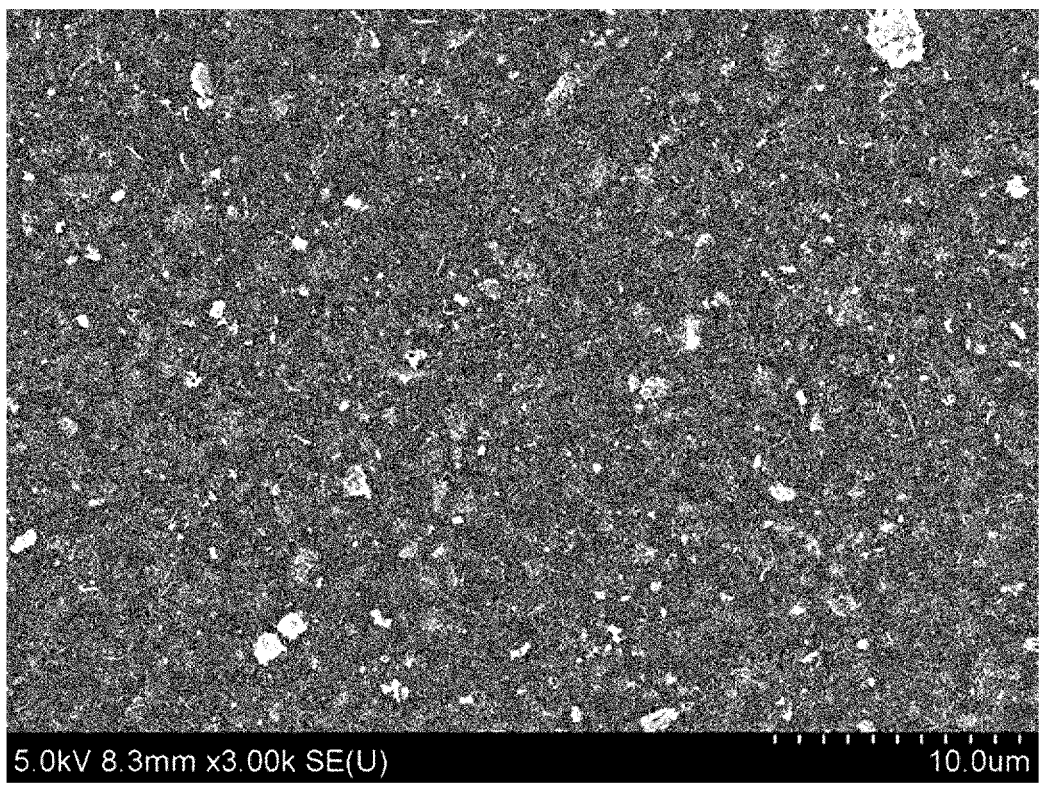
FIG. 13 shows a picture of a conductive material dispersed liquid of Example 2-3 observed using a scanning electron microscope.
Figure 14:
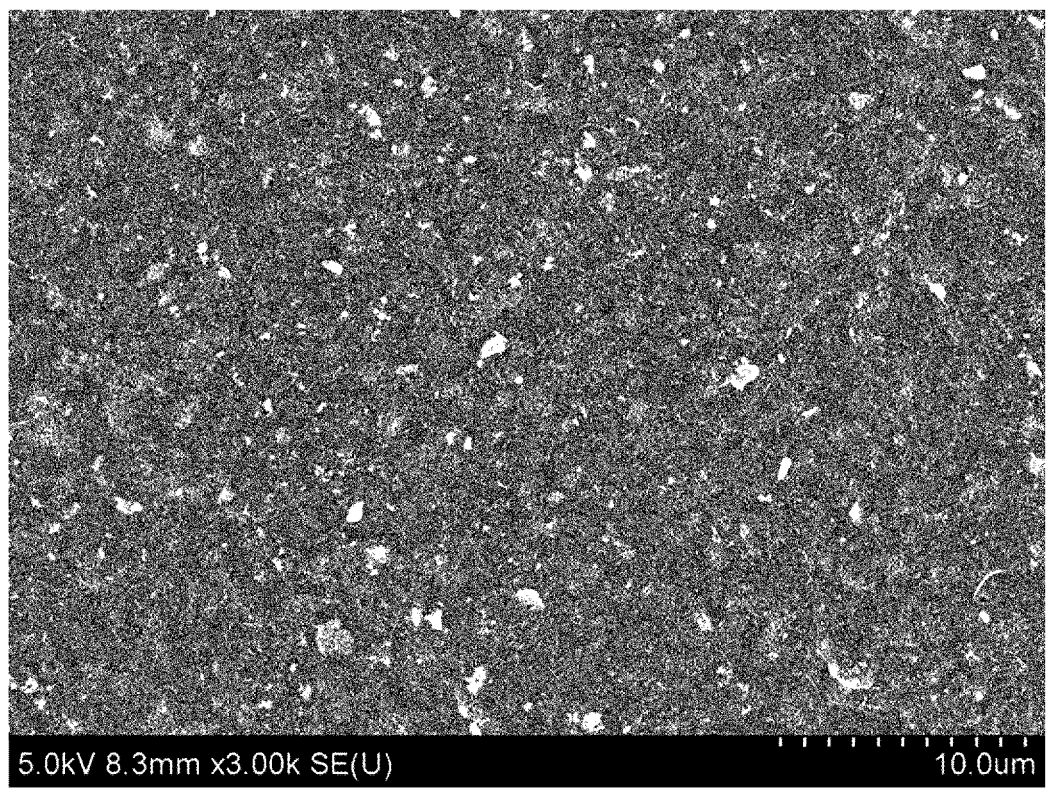
FIG. 14 shows a picture of a conductive material dispersed liquid of Example 2-4 observed using a scanning electron microscope.
Figure 15:
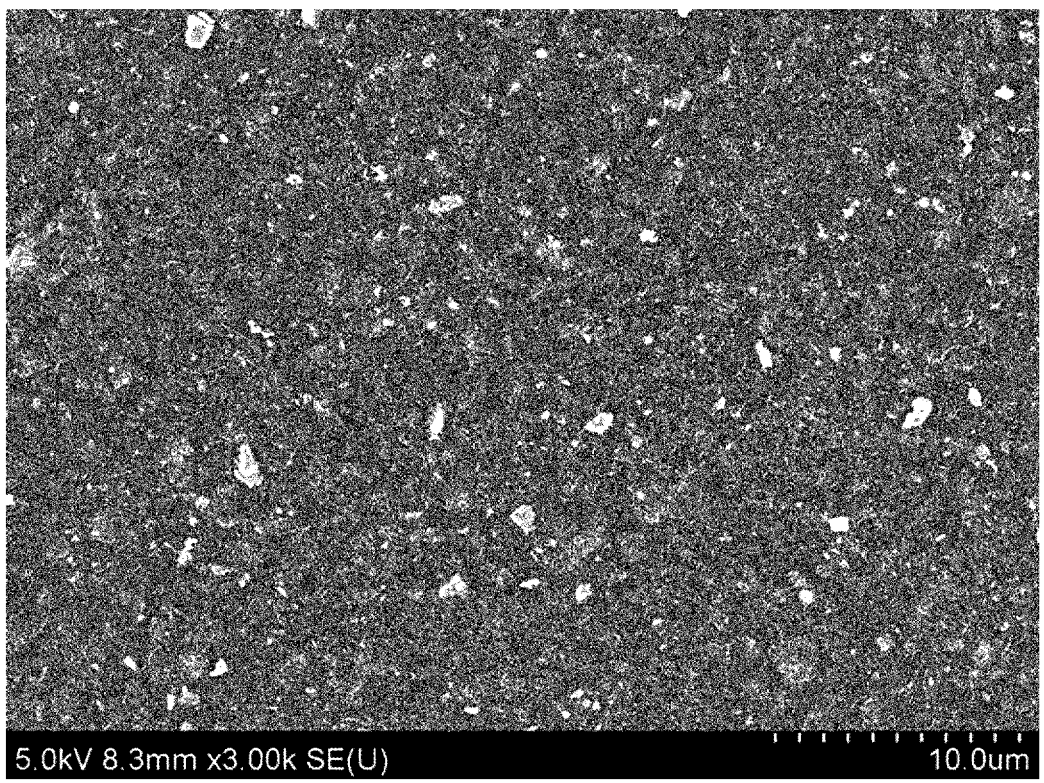
FIG. 15 shows a picture of a conductive material dispersed liquid of Example 2-5 observed using a scanning electron microscope.
Figure 16:
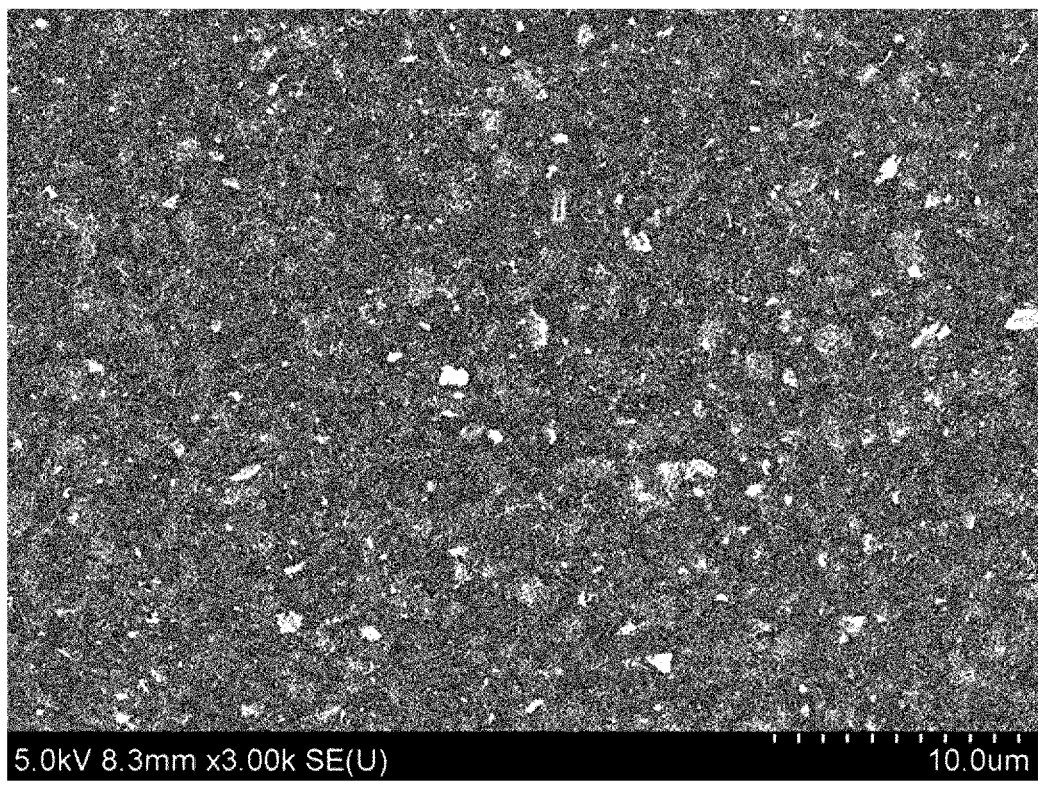
FIG. 16 shows a picture of a conductive material dispersed liquid of Example 2-6 observed using a scanning electron microscope.
Figure 17:
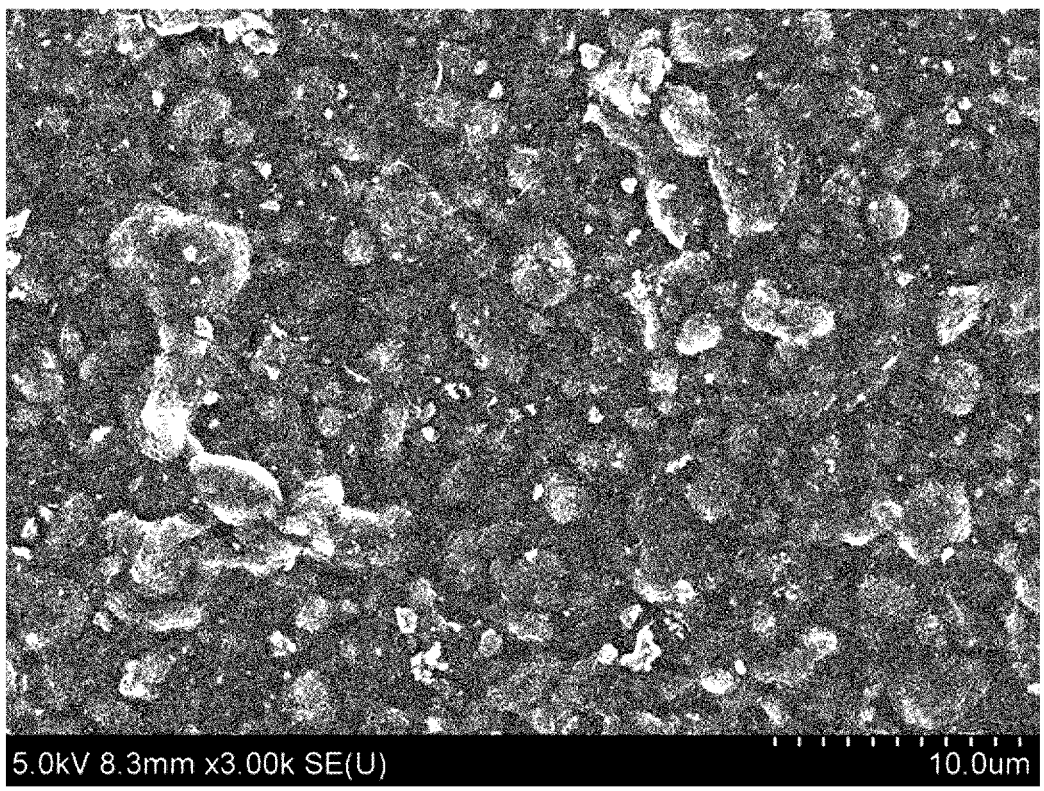
FIG. 17 shows a picture of a conductive material dispersed liquid of Comparative Example 2-1 observed using a scanning electron microscope.
Figure 18:
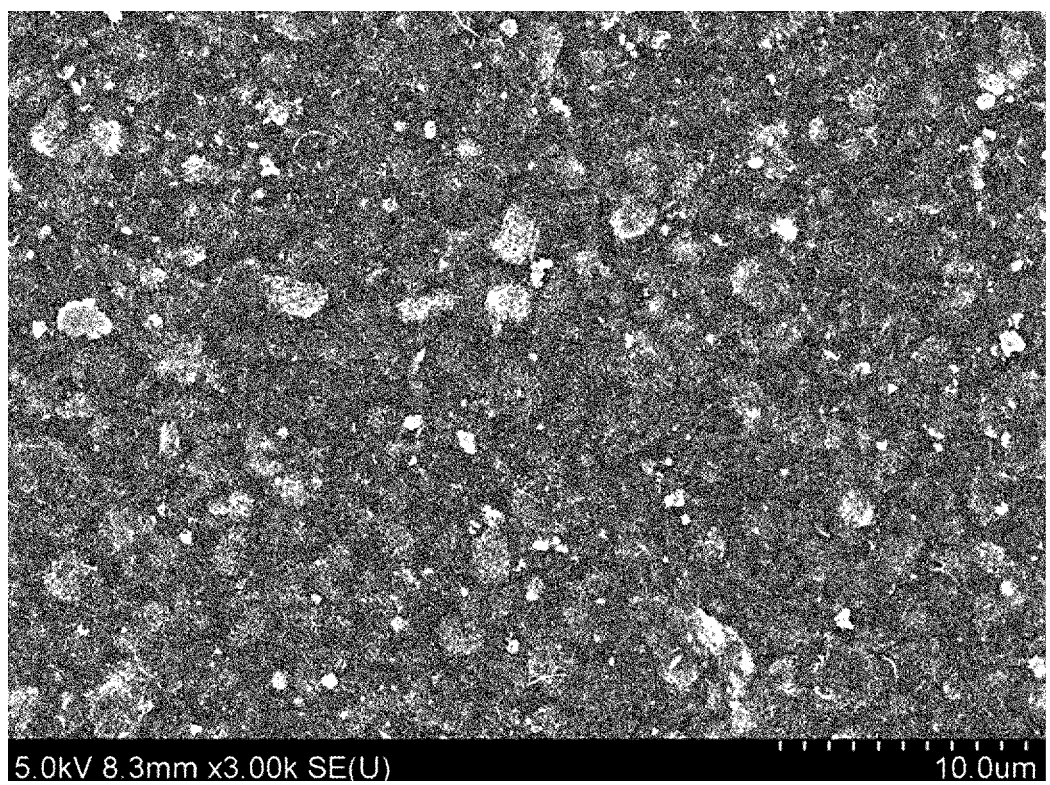
FIG. 18 shows a picture of a conductive material dispersed liquid of Comparative Example 2-2 observed using a scanning electron microscope.

The conductive material dispersed liquids of Examples 2-1 to 2-6 and Comparative Examples 2-1 and 2-2 were observed using a scanning electron microscope (SEM). The result of observing the conductive material dispersed liquid of Example 2-1 is shown in FIG. 11, the result of observing the conductive material dispersed liquid of Example 2-2 is shown in FIG. 12, the result of observing the conductive material dispersed liquid of Example 2-3 is shown in FIG. 13, the result of observing the conductive material dispersed liquid of Example 2-4 is shown in FIG. 14, the result of observing the conductive material dispersed liquid of Example 2-5 is shown in FIG. 15, and the result of observing the conductive material dispersed liquid of Example 2-6 is shown in FIG. 16. The result of observing the conductive material dispersed liquid of Comparative Example 2-1 is shown in FIG. 17. The result of observing the conductive material dispersed liquid of Comparative Example 2-2 is shown in FIG. 18.

As a result of observation, it was confirmed that the components were uniformly dispersed in the case of the conductive material dispersed liquids of Examples 2-1 to 2-6. However, it was confirmed that the components of the conductive material dispersed liquids of Comparative Examples 2-1 and 2-2 were not uniformly dispersed compared to those of the conductive material dispersed liquids of Examples 2-1 to 2-6.

Examples 3-1 to 3-6, and Comparative Examples 3-1 and 3-2: Preparation of Composition for Forming Positive Electrode A composition for forming a positive electrode containing 23.35 wt % of the conductive material dispersed liquid described in Table 6, 75.49 wt % of $LiNi_{0.6}Mn_{0.2}Co_{0.2}O_2$ which is a positive electrode active material and 1.16 wt % of a binder based on the total weight of the composition for forming a positive electrode was prepared, and the viscosity thereof is shown in Table 6 below.

BF viscosity: the viscosity at 10 rpm was measured using a Brookfield viscometer.

TABLE 6

| Classification | Conductive material dispersed liquid | Positive electrode active material | Binder | Viscosity (mPa · s) |
|---|---|---|---|---|
| Example 3-1 | Example 2-1 | LiNi$_{0.6}$Mn$_{0.2}$Co$_{0.2}$O$_2$ | Polyvinylidene fluoride | 15,000 |
| Example 3-2 | Example 2-2 | | | 13,800 |
| Example 3-3 | Example 2-3 | | | 16,800 |
| Example 3-4 | Example 2-4 | | | 17,900 |
| Example 3-5 | Example 2-5 | | | 21,000 |
| Example 3-6 | Example 2-6 | | | 11,000 |
| Comparative Example 3-1 | Comparative Example 2-1 | | | 12,000 |
| Comparative Example 3-2 | Comparative Example 2-2 | | | 21,000 |

Figure 19:
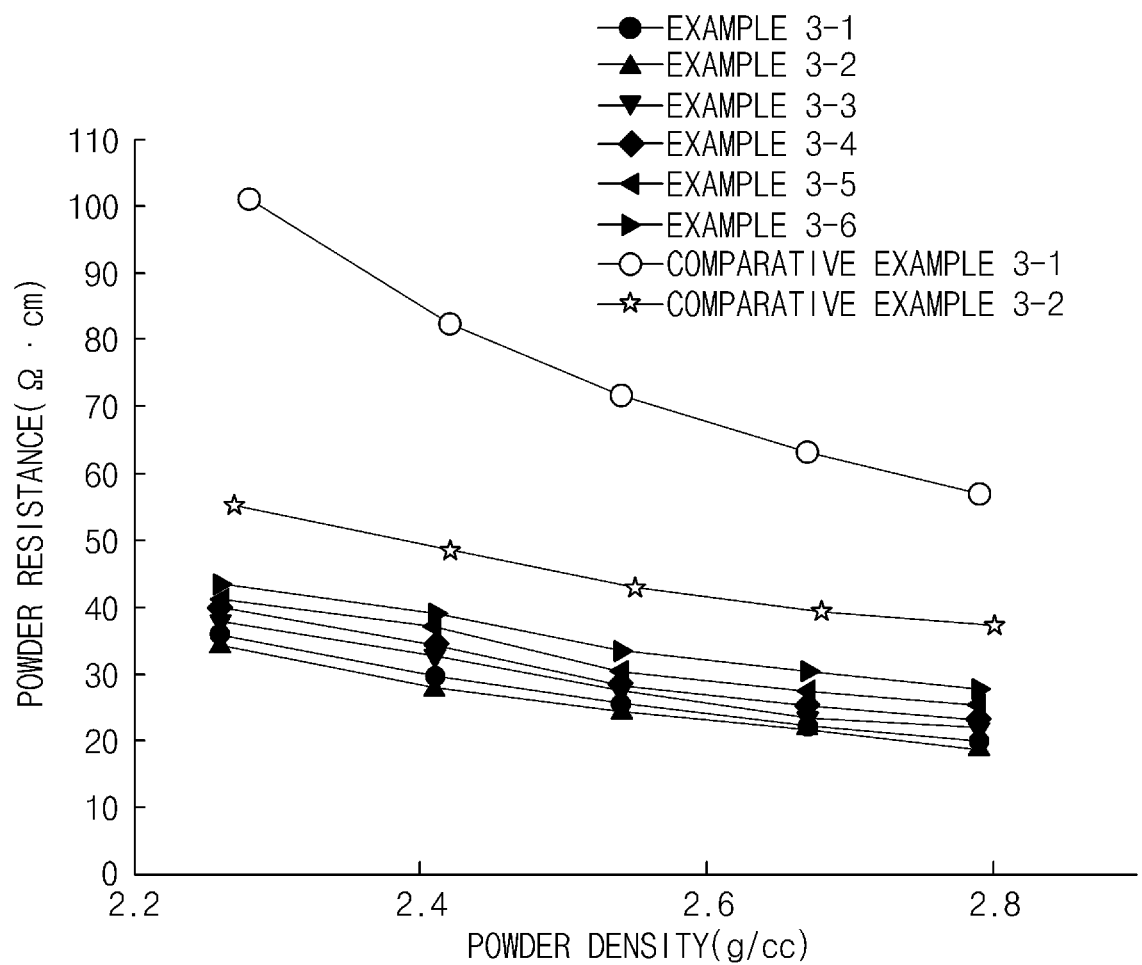
FIG. 19 is a graph showing a result of observing a powder resistance after removing solvents of compositions for forming a positive electrode prepared in Examples 3-1 to 3-6, and Comparative Examples 3-1 and 3-2.

Experimental Example 3-1: Evaluation of Characteristics of Composition for Forming Positive Electrode Changes in powder resistance (volume resistivity) according to the powder density of the composition for forming a positive electrode of Examples 3-1 to 3-6 and Comparative Examples 3-1 and 3-2 were observed. The results are shown in Table 7 and FIG. 19.

*Powder resistance: the powder of the composition for forming a positive electrode obtained by removing all the solvent was filled in an insulating mold having a diameter of 1 mm and pressed, and the surface current and voltage were measured with four probes. The correction factor was applied to calculate the volume resistance according to pressure.

TABLE 7

| | Pressure (MPa) | | | | |
|---|---|---|---|---|---|
| | 13 | 25 | 37 | 50 | 62 |
| | Powder density (g/cc) | | | | |
| | 2.3 | 2.4 | 2.5 | 2.6 | 2.7 |
| Classification | Powder resistance (Ω · cm) | | | | |
| Example 3-1 | 35.9 | 29.6 | 25.4 | 22.2 | 19.8 |
| Example 3-2 | 34.2 | 27.8 | 24.4 | 21.9 | 18.7 |
| Example 3-3 | 37.7 | 32.8 | 27.3 | 23.1 | 21.9 |
| Example 3-4 | 39.9 | 34.4 | 28.4 | 25.3 | 23.1 |
| Example 3-5 | 41.2 | 37.1 | 30.3 | 27.4 | 25.3 |
| Example 3-6 | 43.1 | 39.2 | 33.4 | 30.4 | 27.8 |
| Comparative Example 3-1 | 101.0 | 82.5 | 71.8 | 63.2 | 57.0 |
| Comparative Example 3-2 | 55.2 | 48.5 | 42.9 | 39.2 | 36.4 |

As a result, the composition for forming a positive electrode of Examples 3-1 to 3-6 had a powder resistance in the range of 34.2 to 43.1 Ω·cm when a pressure was 13 MPa, a powder resistance in the range of 27.8 to 39.2 Ω·cm when a pressure was 25 MPa, a powder resistance in the range of 24.4 to 33.4 Ω·cm when a pressure was 37 MPa, a powder resistance in the range of 21.9 to 30.4 Ω·cm when a pressure was 50 MPa, and a powder resistance in the range of 18.7 to 27.8 Ω·cm when a pressure was 62 MPa.

As such, it can be seen that, the powder resistances of Examples 3-1 to 3-6 are lower than those of Comparative Examples 3-1 and 3-2 at the same pressure.

Examples 4-1 to 4-6 and Comparative Examples 4-1 and 4-2: Preparation of Lithium Secondary Battery The composition for forming a positive electrode described in Table 8 was applied onto an aluminum current collector, dried at 130° C., and rolled to prepare a positive electrode. Further, 353 g of a mixture obtained by mixing 97 wt % of graphite as a negative electrode active material, 1 wt % of carbon black as a conductive material, 1 wt % of styrene butadiene rubber (SBR) as a binder, and 1 wt % of carboxymethyl cellulose (CMC) as a thickener based on the total weight of the mixture was mixed with 250 ml of water to prepare a composition for forming a negative electrode, and the composition was applied onto a copper current collector to prepare a negative electrode.

The electrode assembly was prepared by interposing a porous polyethylene separator between the positive electrode and negative electrode prepared as above, the electrode assembly was placed inside a case, and an electrolyte was injected into the case to prepare a lithium secondary battery. Here, the electrolyte was prepared by dissolving 1.0 M lithium hexafluorophosphate (LiPF$_6$) in an organic solvent including ethylene carbonate/dimethyl carbonate/ethyl methyl carbonate (volume ratio of mixed EC/DMC/EMC=3/4/3).

TABLE 8

| Classification | Composition for forming positive electrode |
|---|---|
| Example 4-1 | Example 3-1 |
| Example 4-2 | Example 3-2 |
| Example 4-3 | Example 3-3 |
| Example 4-4 | Example 3-4 |
| Example 4-5 | Example 3-5 |
| Example 4-6 | Example 3-6 |
| Comparative Example 4-1 | Comparative Example 3-1 |
| Comparative Example 4-2 | Comparative Example 3-2 |

Experimental Example 4-1: Evaluation of Characteristics of Lithium Secondary Battery Each change in voltage over time of the lithium secondary batteries of Examples 4-1 to 4-6 and Comparative Examples 4-1 and 4-2 was measured when discharged at a low temperature (−10° C.) under the condition of 6.5 C based on SOC 50% (cut off voltage: 1.9V). The results are shown in Table 9 and FIG. 20.

TABLE 9

| | Time (sec) | | | |
|---|---|---|---|---|
| | 5 | 10 | 15 | 20 |
| Classification | Voltage (V) | | | |
| Example 4-1 | 2.716 | 2.579 | 2.434 | 2.249 |
| Example 4-2 | 2.706 | 2.575 | 2.435 | 2.275 |

TABLE 9-continued

| Classification | Time (sec) | | | |
| --- | --- | --- | --- | --- |
| | 5 | 10 | 15 | 20 |
| | Voltage (V) | | | |
| Example 4-3 | 2.630 | 2.482 | 2.315 | 2.105 |
| Example 4-4 | 2.585 | 2.429 | 2.255 | 2.029 |
| Example 4-5 | 2.634 | 2.471 | 2.281 | 2.005 |
| Example 4-6 | 2.611 | 2.438 | 2.229 | 1.915 |
| Comparative Example 4-1 | 2.478 | 2.229 | 2.073 | — |
| Comparative Example 4-2 | 2.537 | 2.369 | 2.168 | 1.907 |

Figure 20:
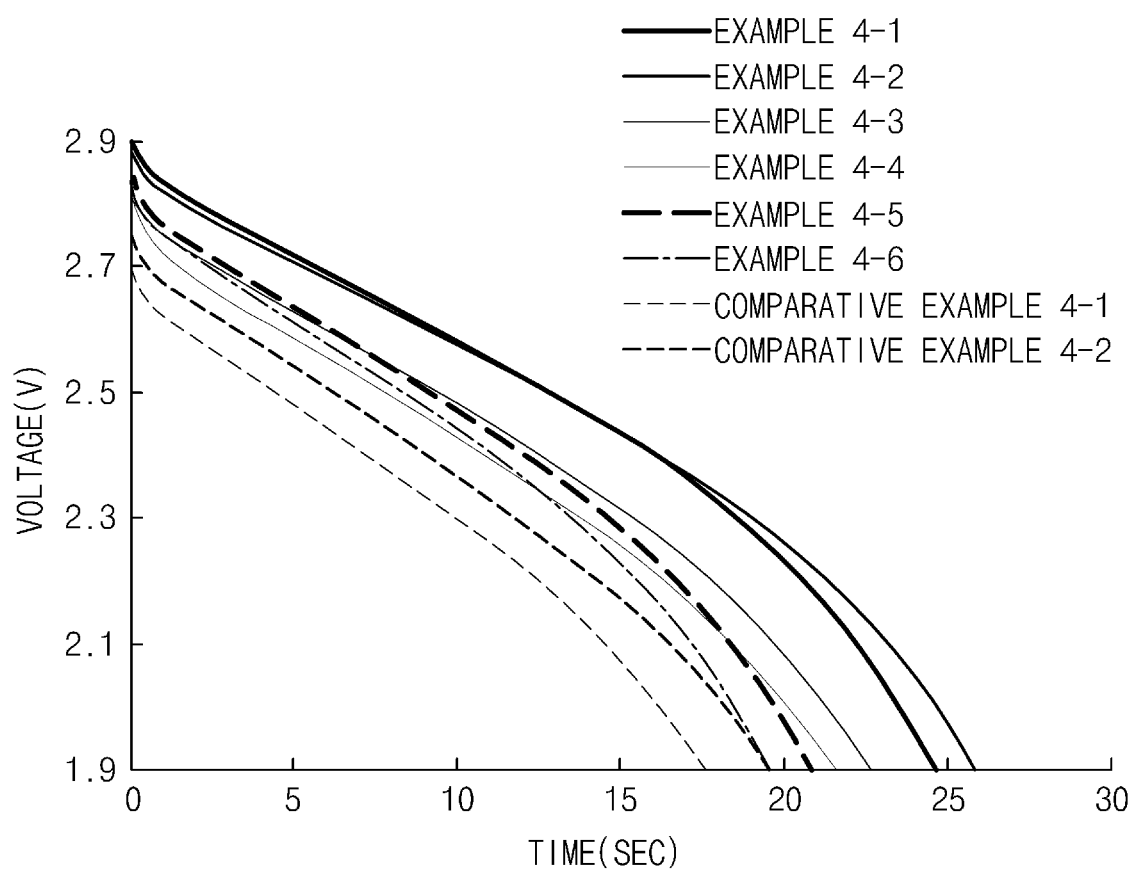
FIG. 20 is a graph showing a result of observing output characteristics of lithium secondary batteries of Examples 4-1 to 4-6, and Comparative Examples 4-1 and 4-2 upon discharge at low temperature (−10° C.).

Referring to Table 9 and FIG. 20, the lithium secondary batteries of Examples 4-1 to 4-6 exhibited excellent output characteristics at low temperature as compared with the lithium secondary batteries of Comparative Examples 4-1 to 4-2. Further, in the case of the lithium secondary battery of Comparative Example 4-1, discharge could not be continued for 20 seconds.

The invention claimed is:

1. A conductive material dispersed liquid, comprising a conductive material, a nitrile based rubber dispersant, and a dispersion medium, wherein the conductive material includes bundle-type carbon nanotubes having a bulk density in a range of 10 to 50 kg/m³ and a conductivity satisfying the condition of the following Equation 1, $-X \leq 10 \log R \leq -0.6X$ [Equation 1]

wherein in Equation 1 above, X is a bulk density of the carbon nanotubes, and R is a powder resistivity of the carbon nanotubes under a pressure of 10 to 65 MPa.

2. The conductive material dispersed liquid according to claim 1, wherein the carbon nanotubes have a bulk density in a range of 20 to 35 kg/m³ and a powder resistivity in a range of 0.001 to 0.01 Ω·cm under a pressure of 10 to 65 MPa.

3. The conductive material dispersed liquid according to claim 1, wherein a ratio (TD/BD ratio) of a true density (TD) to a bulk density (BD) of the carbon nanotubes is in a range of 70 to 120.

4. The conductive material dispersed liquid according to claim 1, wherein the true density of the carbon nanotubes is in a range of 1,800 to 2,200 kg/m³.

5. The conductive material dispersed liquid according to claim 1, wherein a BET specific surface area of the carbon nanotubes is in a range of 180 to 300 m²/g.

6. The conductive material dispersed liquid according to claim 1, wherein the carbon nanotubes include a carbon nanotube unit having an average diameter in a range of 10 to 20 nm.

7. The conductive material dispersed liquid according to claim 1, wherein the carbon nanotubes have an average value in a range of 0.75 to 1.05 and a standard deviation value in a range of 1.3 to 2.0% of a ratio (ID/IG) of a maximum peak intensity (ID) of a D band at 1,360±50 cm⁻¹ to a maximum peak intensity (IG) of a G band at 1,580±50 cm⁻¹ obtained by Raman spectroscopy using a laser having a wavelength of 532 nm.

8. The conductive material dispersed liquid according to claim 1, wherein the dispersant includes a hydrogenated nitrile butadiene-based rubber.

9. The conductive material dispersed liquid according to claim 1, wherein the dispersant includes a hydrogenated nitrile butadiene-based rubber containing a structural unit derived from an α,β-unsaturated nitrile at 20 to 65 wt % based on the total weight.

10. The conductive material dispersed liquid according to claim 1, wherein the dispersant includes a hydrogenated nitrile butadiene-based rubber containing a structural unit derived from a hydrogenated conjugated diene at 1 to 30 wt % based on the total weight.

11. The conductive material dispersed liquid according to claim 1, wherein the dispersant is included at 1 to 50 parts by weight based on 100 parts by weight of the carbon nanotubes.

12. The conductive material dispersed liquid according to claim 1, wherein the dispersant is introduced on a surface of the carbon nanotube to form a carbon nanotube-dispersant composite, and a particle size distribution according to the following Equation 3 of the carbon nanotube-dispersant composite is in a range of 2 to 6.5, Particle size distribution of carbon nanotube–dispersant composite=$(D_{90}-D_{10})/D_{50}$ [Equation 3]

wherein in Equation 3 above, $D_{10}$, $D_{50}$ and $D_{90}$ each represent particle sizes on a basis of 10%, 50% and 90% in a particle size distribution of a carbon nanotube-dispersant composite.

13. A composition for forming an electrode of a lithium secondary battery, comprising:
an electrode active material; and
a conductive material dispersed liquid according to claim 1.

14. A lithium secondary battery, comprising a positive electrode, a negative electrode, a separator and an electrolyte, wherein at least one of the positive electrode and the negative electrode is prepared using the composition for forming an electrode according to claim 13.

15. A conductive material dispersed liquid, comprising a conductive material, a hydrogenated nitrile butadiene-based rubber dispersant, and a dispersion medium,
wherein the conductive material includes bundle-type carbon nanotubes having a bulk density in a range of 10 to 50 kg/m³ and a conductivity satisfying the condition of the following Equation 1, $-X \leq 10 \log R \leq -0.6X$ [Equation 1]

wherein in Equation 1 above, X is a bulk density of the carbon nanotubes, and R is a powder resistivity of the carbon nanotubes under a pressure of 10 to 65 MPa.

* * * * *